US009894510B1

(12) United States Patent
Kortunov et al.

(10) Patent No.: US 9,894,510 B1
(45) Date of Patent: Feb. 13, 2018

(54) EVENT-BASED DATA BACKUP AND RECOVERY FOR MOBILE DEVICES

(71) Applicant: Acronis International GmbH, Schaffhausen (CH)

(72) Inventors: Denis Kortunov, Moscow (RU); Stanislav S. Protassov, Moscow (RU); Serguei M. Beloussov, Singapore (SG)

(73) Assignee: ACRONIS INTERNATIONAL GMBH, Schaffhausen (CH)

( * ) Notice: Subject to any disclaimer, the term of this patent is extended or adjusted under 35 U.S.C. 154(b) by 0 days.

(21) Appl. No.: 15/204,294

(22) Filed: Jul. 7, 2016

Related U.S. Application Data

(60) Provisional application No. 62/202,971, filed on Aug. 10, 2015.

(51) Int. Cl.
*H04M 3/00* (2006.01)
*H04W 8/18* (2009.01)
*H04W 8/20* (2009.01)
*H04M 1/725* (2006.01)

(52) U.S. Cl.
CPC ....... *H04W 8/183* (2013.01); *H04M 1/72566* (2013.01); *H04W 8/20* (2013.01); *H04M 3/00* (2013.01)

(58) Field of Classification Search
CPC ... H04W 8/183; H04W 8/20; H04M 1/72566; H04M 3/00
USPC .................................................. 455/418, 419
See application file for complete search history.

(56) References Cited

U.S. PATENT DOCUMENTS

| | | | | |
|---|---|---|---|---|
| 8,650,159 B1* | 2/2014 | Zhang | ............... | G06F 17/30194 707/664 |
| 9,176,826 B1* | 11/2015 | Smith | ................... | G06F 9/4411 |
| 9,645,892 B1* | 5/2017 | Patwardhan | ........ | G06F 11/1466 |
| 2002/0038296 A1* | 3/2002 | Margolus | .......... | G06F 17/30097 |
| 2008/0033922 A1* | 2/2008 | Cisler | ............... | G06F 17/30693 |
| 2011/0161297 A1* | 6/2011 | Parab | ................ | G06F 17/30156 707/646 |
| 2011/0320689 A1* | 12/2011 | Cho | ..................... | G06F 12/0246 711/103 |
| 2012/0124306 A1* | 5/2012 | Abercrombie | ...... | G06F 11/1461 711/162 |
| 2013/0036091 A1* | 2/2013 | Provenzano | ....... | G06F 17/30162 707/624 |
| 2013/0173229 A1* | 7/2013 | Heikkonen | ......... | G06F 17/5009 703/1 |
| 2013/0325859 A1* | 12/2013 | Porter | ............... | G06F 17/30386 707/736 |

(Continued)

*Primary Examiner* — Mong-Thuy Tran
(74) *Attorney, Agent, or Firm* — Arent Fox LLP; Michael Fainberg

(57) ABSTRACT

A mobile application that allows for backup and restore of user data on a mobile device is provided. The data backup application records a history of all user actions performed with mobile device data. The backup application monitors all of the user actions or applications that affect the mobile device data and reflects it into history, which can be viewed by the user. If the data is affected—it is backed up on a cloud. This works best within a framework of a continuous backup. A user can undo any of his destructive actions and the backup application can restore the affected data from the cloud storage. A history list serves as a filter to user data already located on the cloud.

21 Claims, 29 Drawing Sheets

Continuous or manual backup to cloud

The History is based on the actions that the user has made

(56) References Cited

U.S. PATENT DOCUMENTS

| | | | | |
|---|---|---|---|---|
| 2014/0149794 A1* | 5/2014 | Shetty | ............... | H04L 67/1095 |
| | | | | 714/20 |
| 2014/0358944 A1* | 12/2014 | Brower, Jr. | ....... | G06F 17/30861 |
| | | | | 707/748 |
| 2015/0277402 A1* | 10/2015 | Heine | .................... | G05B 15/02 |
| | | | | 700/87 |
| 2016/0299917 A1* | 10/2016 | Koos | ................ | G06F 17/30174 |

* cited by examiner

You can Undo any destructive action

The History is based on the actions that the user has made

Continuous or manual backup to cloud

FIG. 15

EVENT-BASED DATA BACKUP AND RECOVERY FOR MOBILE DEVICES

CROSS-REFERENCE TO RELATED APPLICATIONS

This application is a non-provisional of U.S. Provisional Patent Application No. 62/202,971, filed on Aug. 10, 2015, the entire contents of which are hereby incorporated by reference.

BACKGROUND OF THE INVENTION

Field of the Invention

This invention relates to a method for backup and recovery, and more particularly, to backup and recovery of mobile device data.

Description of the Related Art

A modern trend for using mobile devices for taking pictures (videos), etc. and for saving a lot of user's data on the mobile device raises an issue of data backup or recovery. This issue is not adequately addressed by any of the existing mobile devices. The mobile devices and especially iOS™-based and Android™-based devices operate with media data—e.g., images, video, messages, etc. instead of files. This makes it convenient for users who do not have to look for files on their devices and do not need to know how to save data files on their devices. However, the task of backup and recovery of media data from the mobile device becomes rather difficult. If some images or videos are deleted by mistake, they are not recoverable on the mobile device. The conventional approach would require finding restore points and searching for files, which is not convenient for mobile device users. The mobile device user often wants to be able to un-do any of the actions performed on his mobile device on-the-fly.

Accordingly, an efficient and user-friendly method for backup and recovery of mobile device data is desired.

SUMMARY OF THE INVENTION

Accordingly, the present invention is directed to a method for backup and recovery of mobile device data that substantially obviates one or more of the disadvantages of the related art.

In one embodiment, a mobile application has a data backup application, which records history of all user actions performed with mobile device data. The backup application monitors all of the user actions or applications that affect mobile device data and reflects it into history, which can be viewed by the user. If the data is affected—it is backed up on a cloud. This works best within a framework of a continuous backup. A user can undo any of his destructive actions and the backup application can restore the affected data from the cloud. A history list serves as a filter to user data already located on the cloud.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIGS. 2-22 illustrate screenshots of graphical user interface of a backup/restore application running on a mobile device;

DETAILED DESCRIPTION OF THE PREFERRED EMBODIMENTS

Figure 1C:
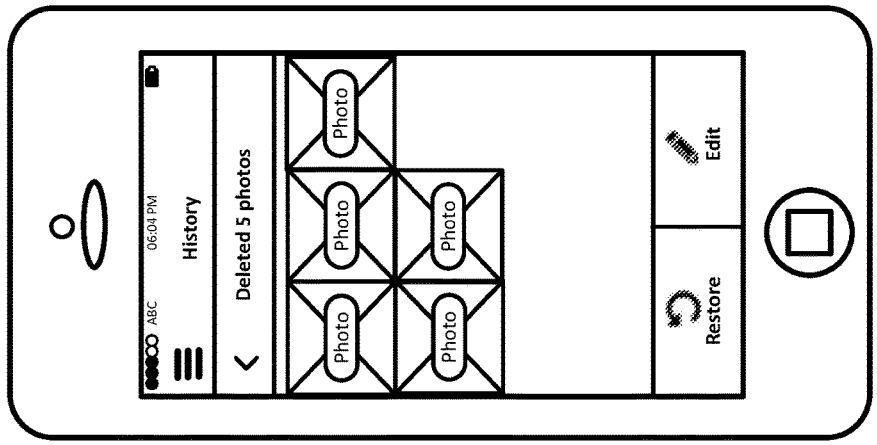
FIGS. 1A, 1B, 1C illustrate graphic example of restoration of items indicated by event history, in accordance with the exemplary embodiment.

Reference will now be made in detail to the preferred embodiments of the present invention, examples of which are illustrated in the accompanying drawings.

A mobile application that allows for backup and restore of user data items, such as images, videos, contacts, calendars, reminders, etc. on a mobile device is provided. In one embodiment, a mobile application has a data backup application, which records history of all user actions performed with mobile device data. The user actions (or actions performed by an application running on the mobile device) can be addition of user data items, deletion of the user data items and modifications of the user data items. The backup application monitors all of the user actions (or actions of applications) that affect user data items and reflects it into history which can be viewed by the user.

The processor time on a user mobile device is recorded and analyzed. The increase in processor time indicates user actions (or application actions). Then, the hard disk (typically, flash memory) of the mobile device is compared to its copy on the cloud. The comparison process can use checksums, hashes or other binary representations of the user files. In one embodiment file sizes can be used. For example, each user picture has a unique file size. If the file of a particular size exists on the mobile device and is not found on the cloud, this means that a new file (i.e., a picture) has been added by the user. Likewise, if the file exists on the cloud and is not found the mobile device, it indicates that the file was lost or deleted and can be restored from the cloud. If a file of the same size is found on the user device under a different name, then it is considered to be a new version, which is backed up to the cloud.

In other words, if the user data is affected by an event, it is backed up onto a cloud. The user can view the history, and if he wants to restore any of the modified or deleted items, he can do it by selecting the items and pressing the restore button. In other words, a user can undo any of his deleting (or editing) actions and the backup application can restore the affected data from the cloud in its original form. A user can also review the event history to see what data items have been added to his mobile device. All newly added items are automatically backed up to the cloud. Thus, a history list serves as a filter to the user data already located on the cloud.

This works best within a framework of a continuous backup. The cloud backup is an Internet storage having a hierarchical file system—e.g., a hierarchy such as user, user devices, directories, subdirectories and files organized by versions. A user can have an option of deleting some pictures on his device while keeping them on the cloud. These files are shown on the user device as deleted, but are available from the backup. The user can have an option of seeing the latest file versions or seeing all of the files backed up to the cloud storage.

According to the exemplary embodiment, a graphical user interface for event-based data backup and recovery is provided. A system includes a mobile device with an internal storage, with the mobile device being connected to the cloud storage. A backup/restore application runs as a background process on the mobile device. The backup application is configured to backup/restore data items affected by one or more events (i.e., user actions or actions taken by user applications) to and from the cloud. The events can be, for example, delete, add, modify (i.e., change/edit) user data. In other words, the backup/restore application uses events as restore points.

In one embodiment, the backup application can delete all the items backed up to the cloud from the user mobile device automatically in order to free up disk space on the mobile device. Alternatively, it can prompt the user, and, then delete the user items selected by the user from his mobile device. In this scenario, the user is presented with the backed up data items and can choose particular (or all) data items to be deleted from his mobile device. In yet another embodiment, the backup application can monitor available space on the user device, and automatically delete the oldest data items when the disk space approaches its limit.

According to one embodiment, the backed up user items are archived on the cloud. In order to render the archived images to the user, they can be conveniently displayed over a geographic map based on the location of image origin. This can be accomplished using the GPS data associated with each image by the user mobile device. Alternatively, the user images can be sorted out by the location (i.e., original GPS data) in the archive and a user is given an opportunity to view his images by locations. The user items can also be grouped by the location in order to be backed up as one batch (e.g., pictures taken during one trip, or at one particular location, etc.) This way, each picture is not associated with individual event, but is connected to the larger trip event.

The trip event can be generated based on a user location, which is different from regular user locations (e.g., home, work, city, etc.). In one embodiment, user access to user items is recorded, and the user items are ranked based on a frequency or a number of accesses. The items with the lowest rank are the first ones to be deleted from the user device when it is required by space limitations.

According to another exemplary embodiment, the backup storage can be implemented, for example, as a local server (i.e., a personal storage), a local external attachable device or network storage.

Figure 1B:
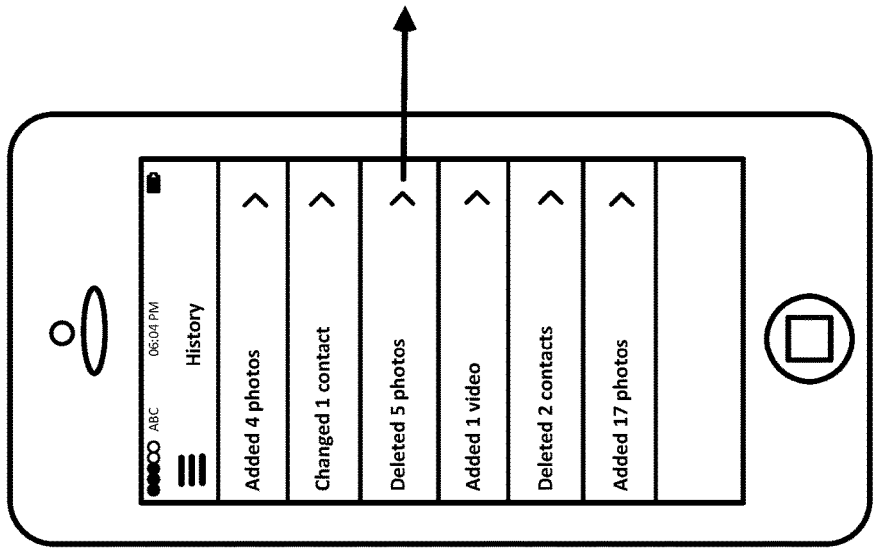
Figure 1A:
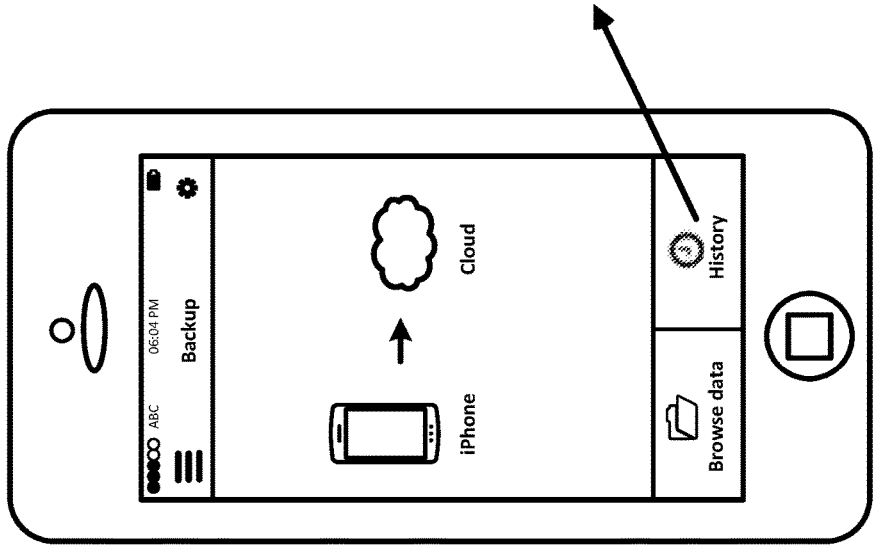

Exemplary basic interfaces are depicted in FIGS. 1A-1C. The backup application monitors the events and provides history to a user—see history button in FIG. 1A. When a user clicks on a history button, a list of events logged by the backup/restore application is rendered to the user as shown in FIG. 1B. This history essentially reflects the differences between the state of the mobile device hard disk and the corresponding cloud storage. The comparison can be done based on a pre-defined time frame (e.g., once an hour, or every 30 minutes, or once every several hours). All the events that took place over an hour (for example) are reflected in the history. In this example, the user is interested in the event in the list, which indicates deletion of five images. If the user clicks on this event in the history list, he is shown the deleted images (see FIG. 1C) and can restore these images by clicking on a "restore" button, which triggers loading of the selected backed up images to the mobile device from the cloud.

This way, the user can always undo any of the destructive or inadvertent actions performed by him or by applications running on his mobile device. The backup/restore procedures can affect any of the user data items such as images, videos, contacts, calendars, reminders, etc. In one embodiment, the files corresponding to a particular event (see FIG. 1C) can have an indication of when the event occurred. In this example, the header or tag (or similar metadata) can say "deleted 5 photos yesterday." Thus, a user can only view the files associated with a particular event, instead of looking through all of the backed up files to detect newly added and deleted files.

Figure 2:
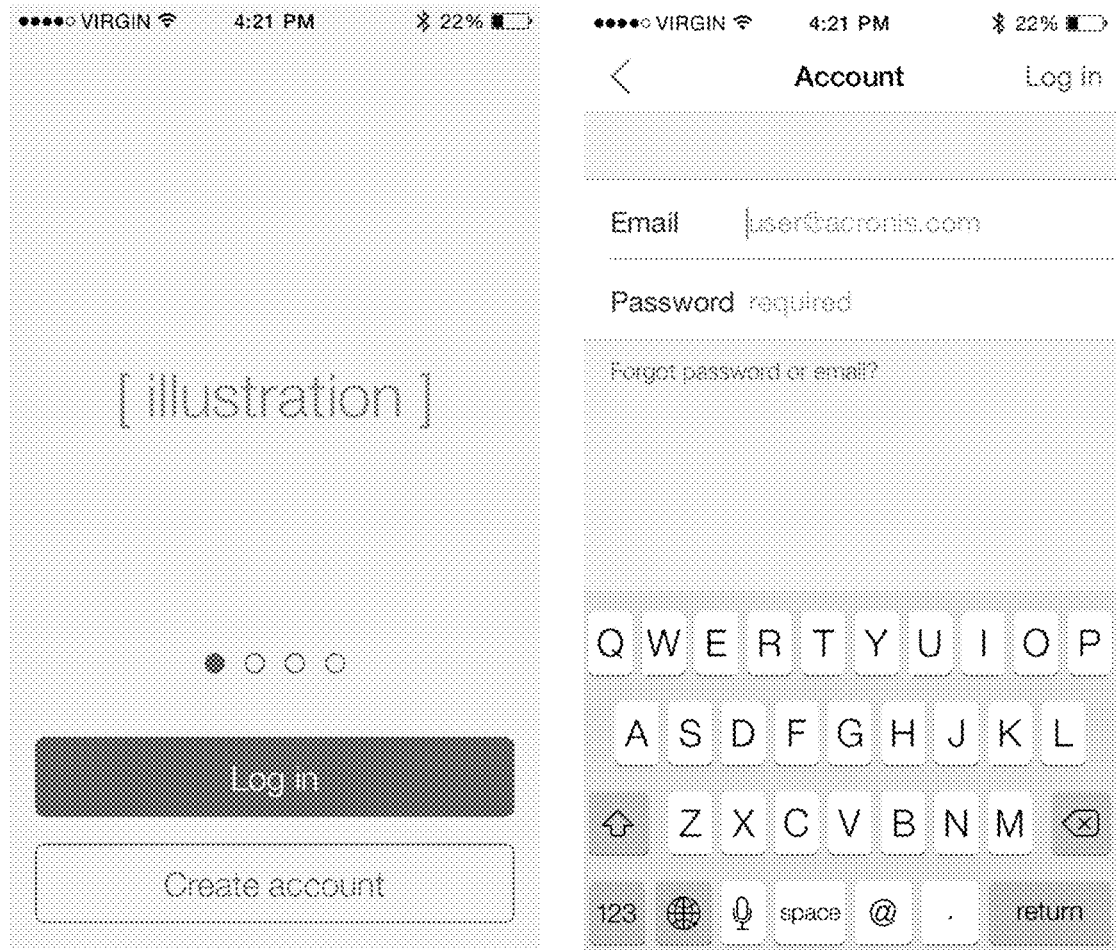
Figure 3:
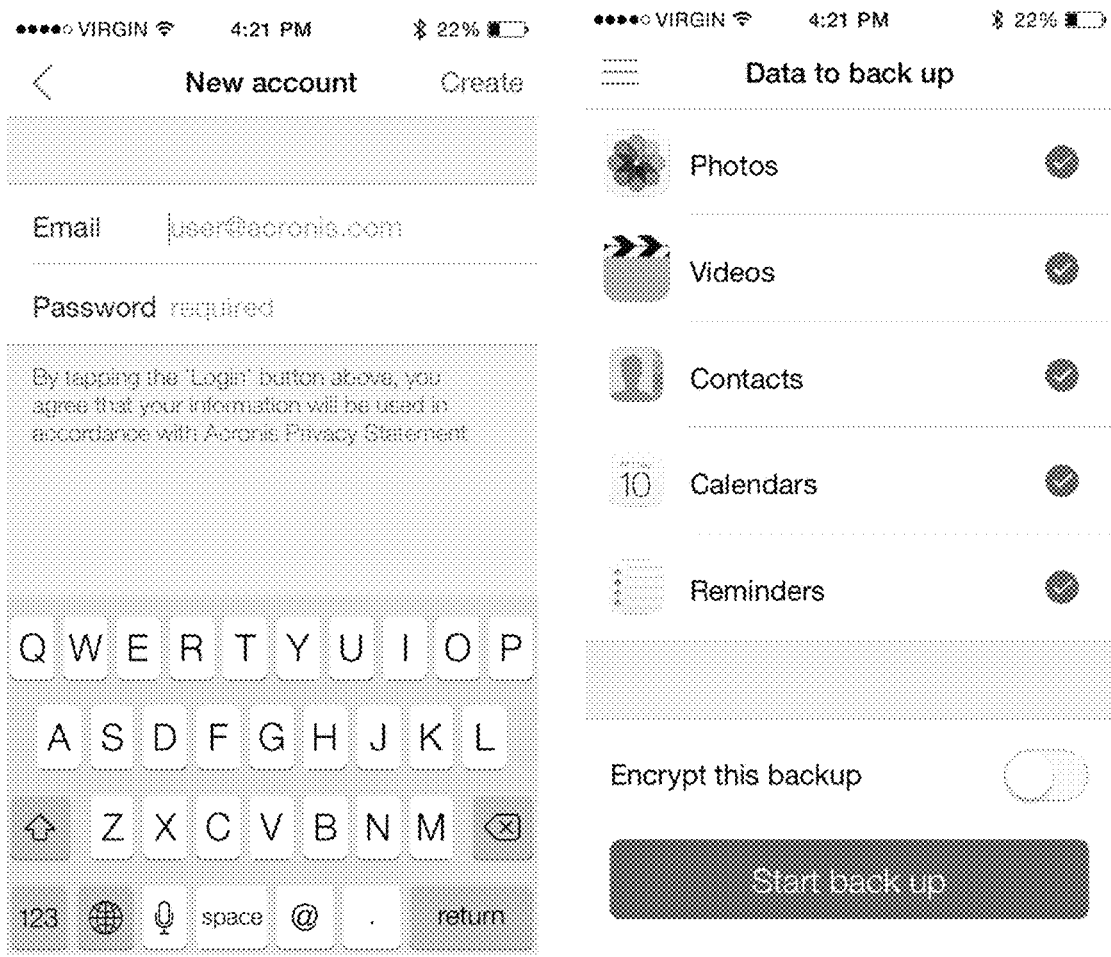

FIG. 2 illustrates screen shots for logging into the backup/restore application. A user can create an account (see FIG. 3 left screenshot) or log into an existing account using his email address and a password. Then, the user is given a list of data that can be backed up: pictures, videos, contacts, calendars and reminders. Other data can also be included into the backup list.

Figure 4:
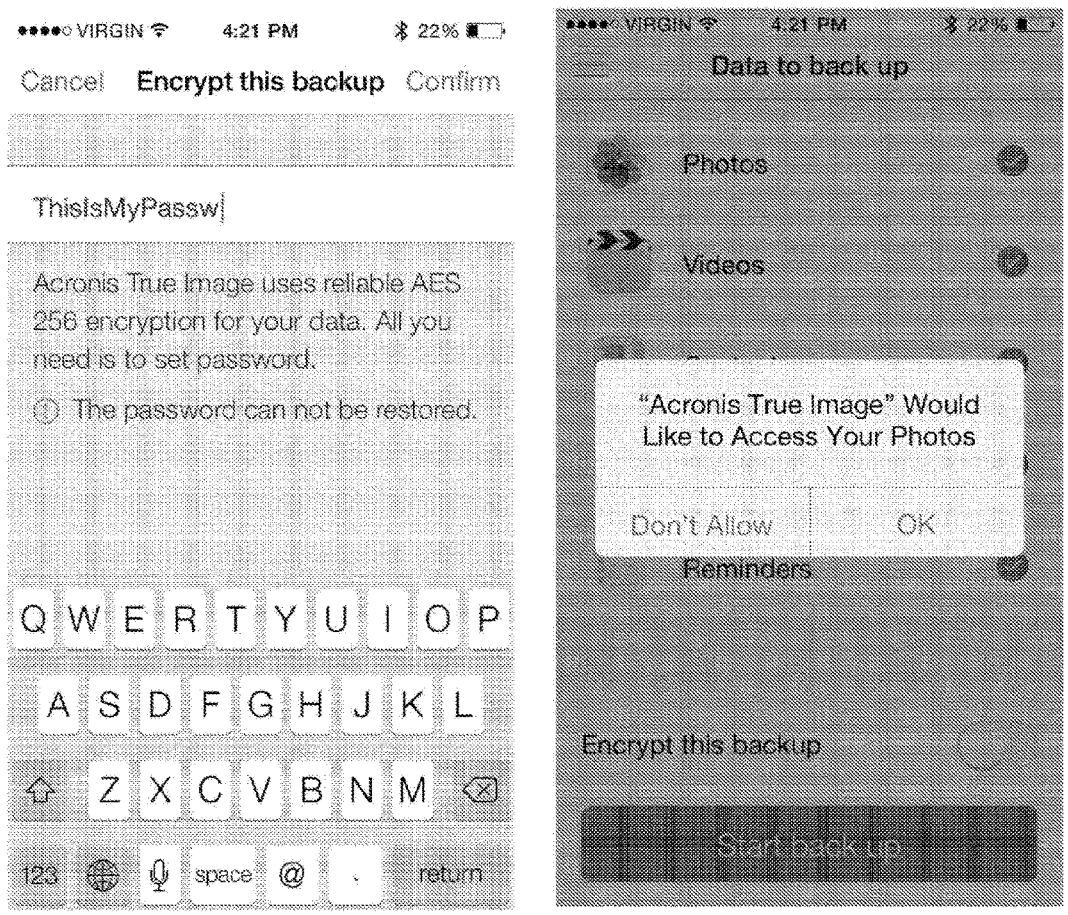
Figure 5:
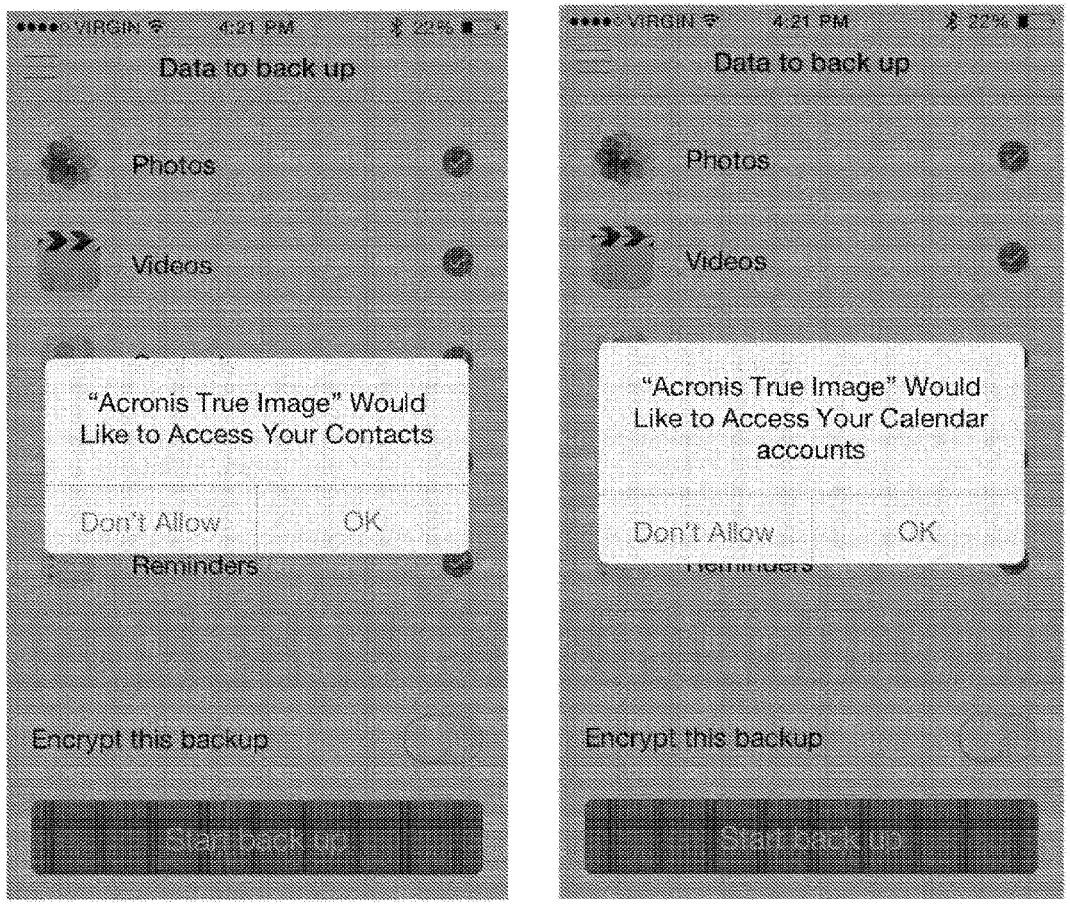
Figure 6:
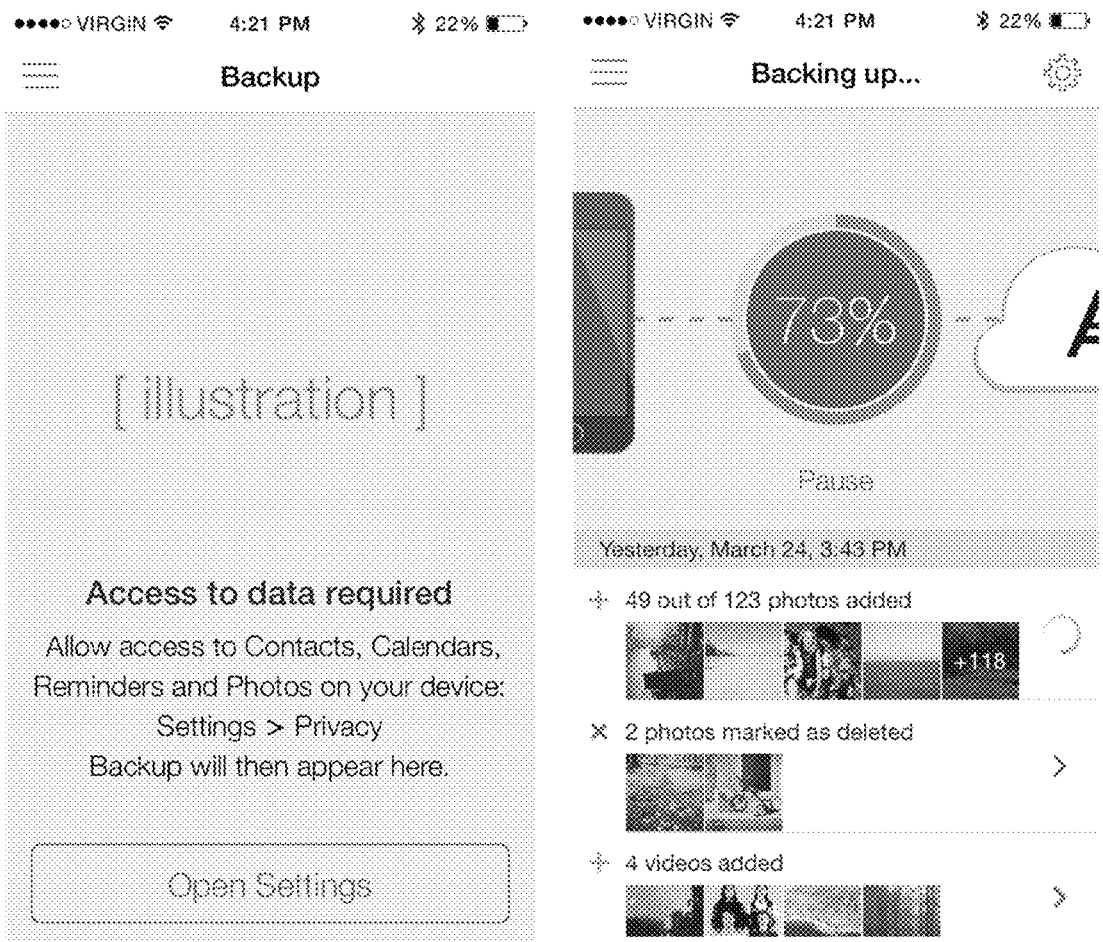
Figure 7:
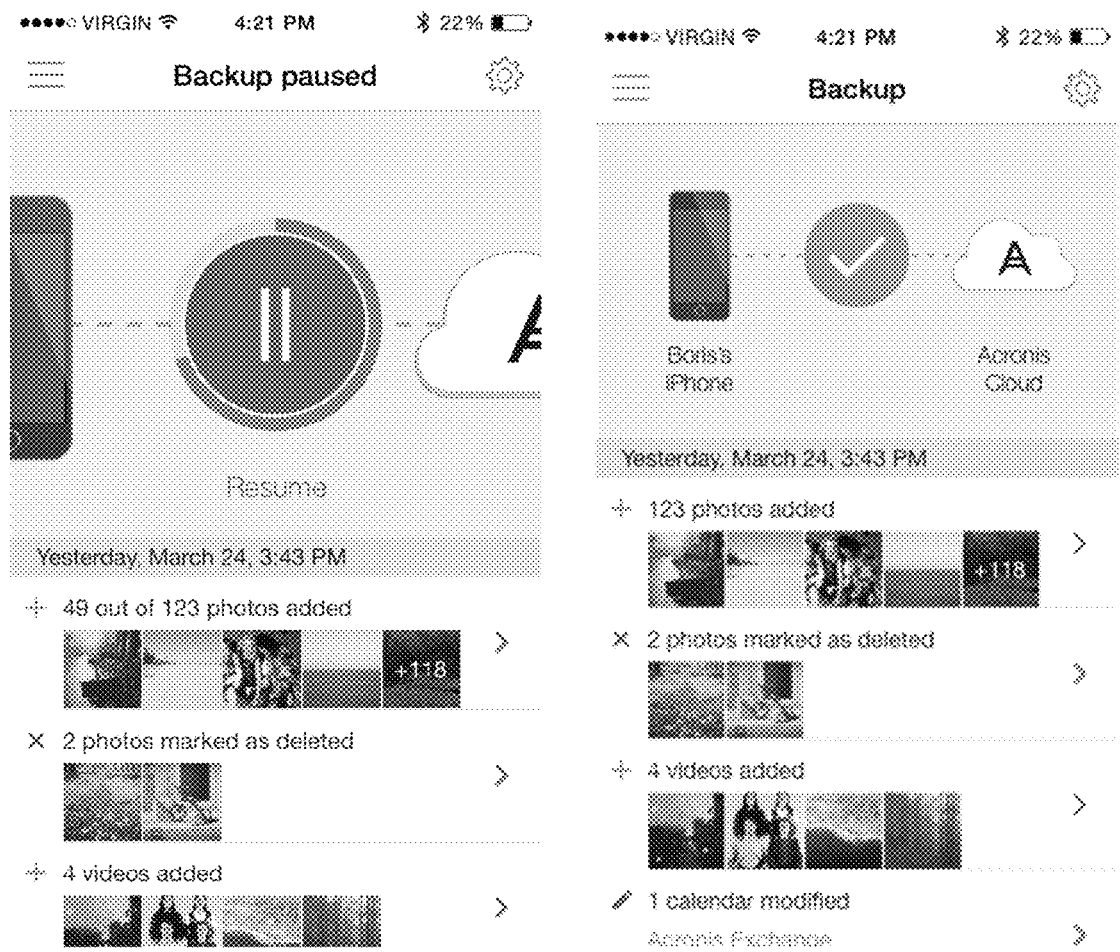

FIG. 4 illustrates a screen shot for encrypting a backup data upon user request. Then, the backup application asks user permission for accessing user images, contacts and calendar accounts (see FIGS. 4 and 5). The user can select setting for backup—see screen shot in FIG. 6 (left). FIG. 6 (right) illustrates a backup progress window showing a percentage of backup completed. FIG. 7 (left) illustrates how a user can pause the backup process and see what items have been already backed up. FIG. 7 (right) illustrates a back up screen displaying all items needed to be backed up based on the events such as pictures/videos deleted or added, calendar modified, etc.

Figure 8:
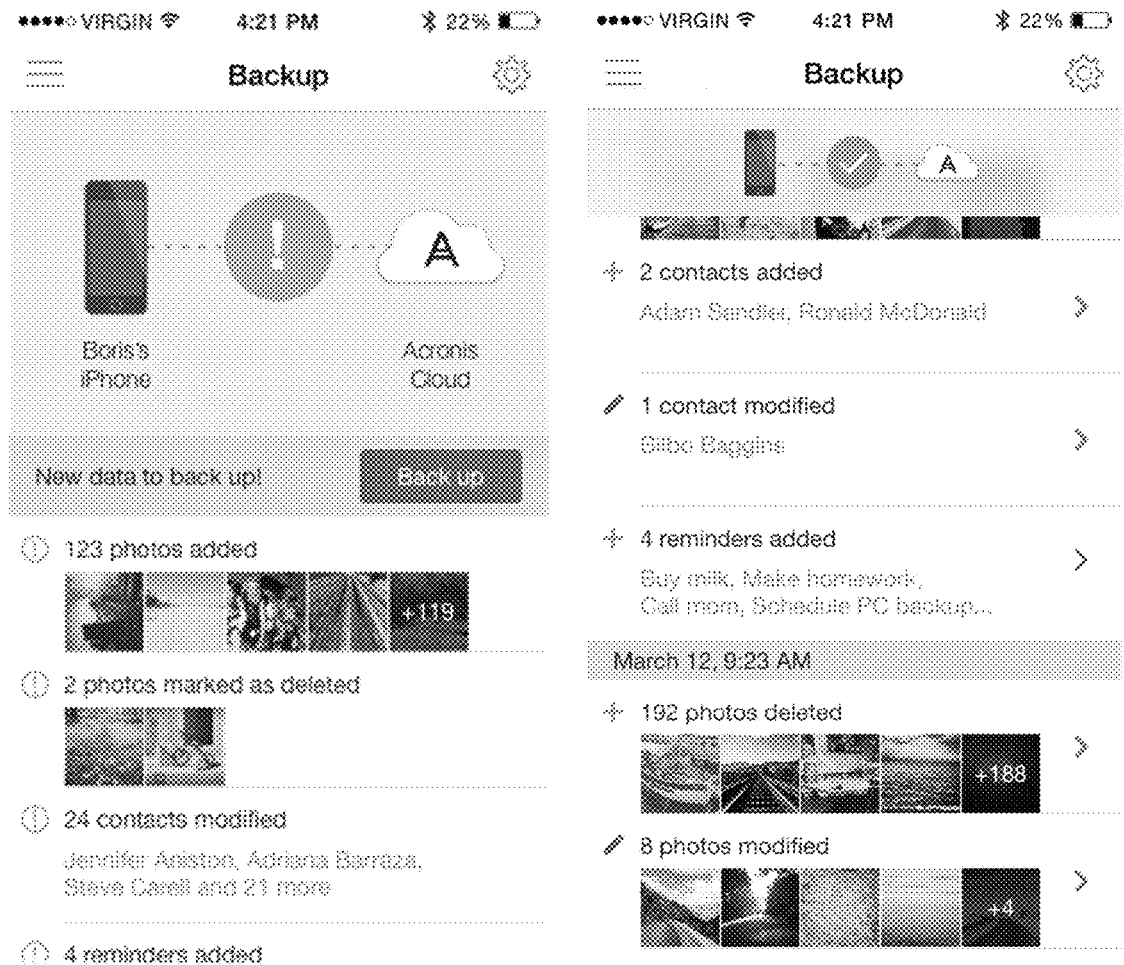
Figure 9:
Figure 10:
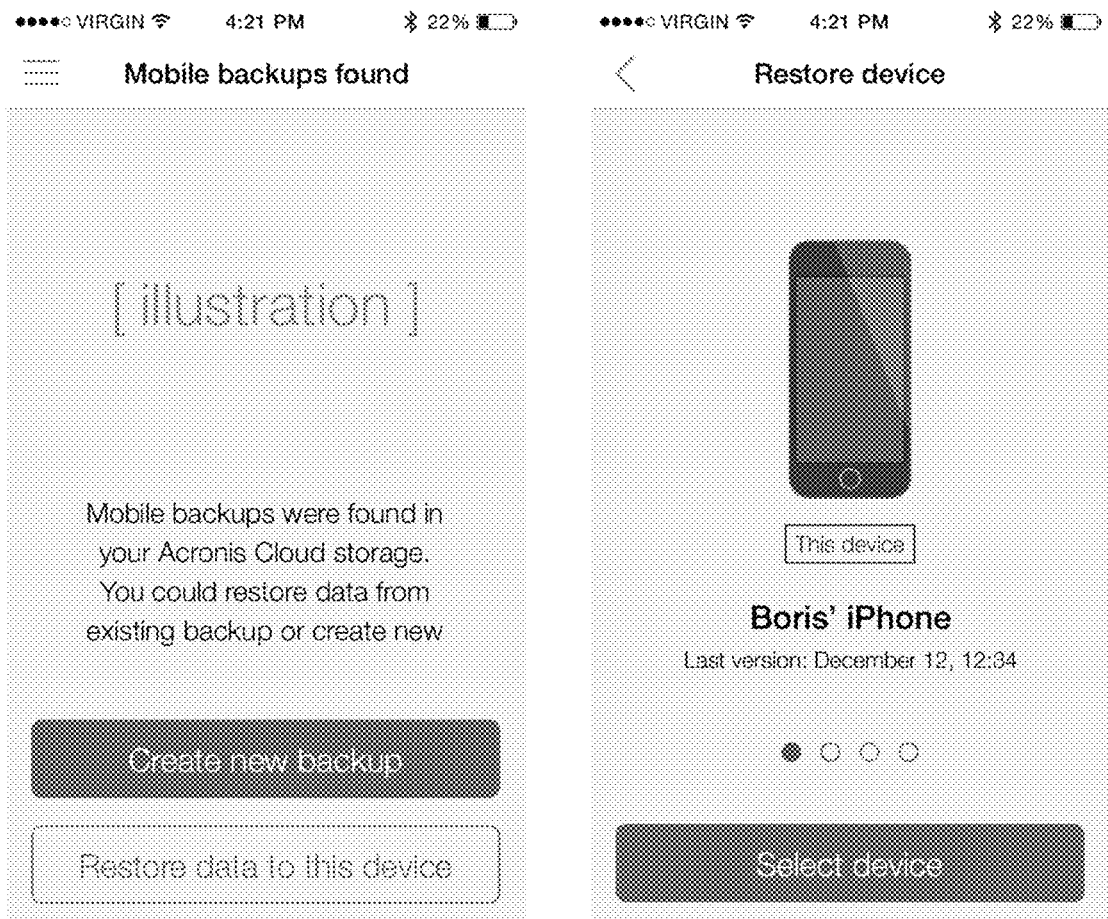
Figure 11:
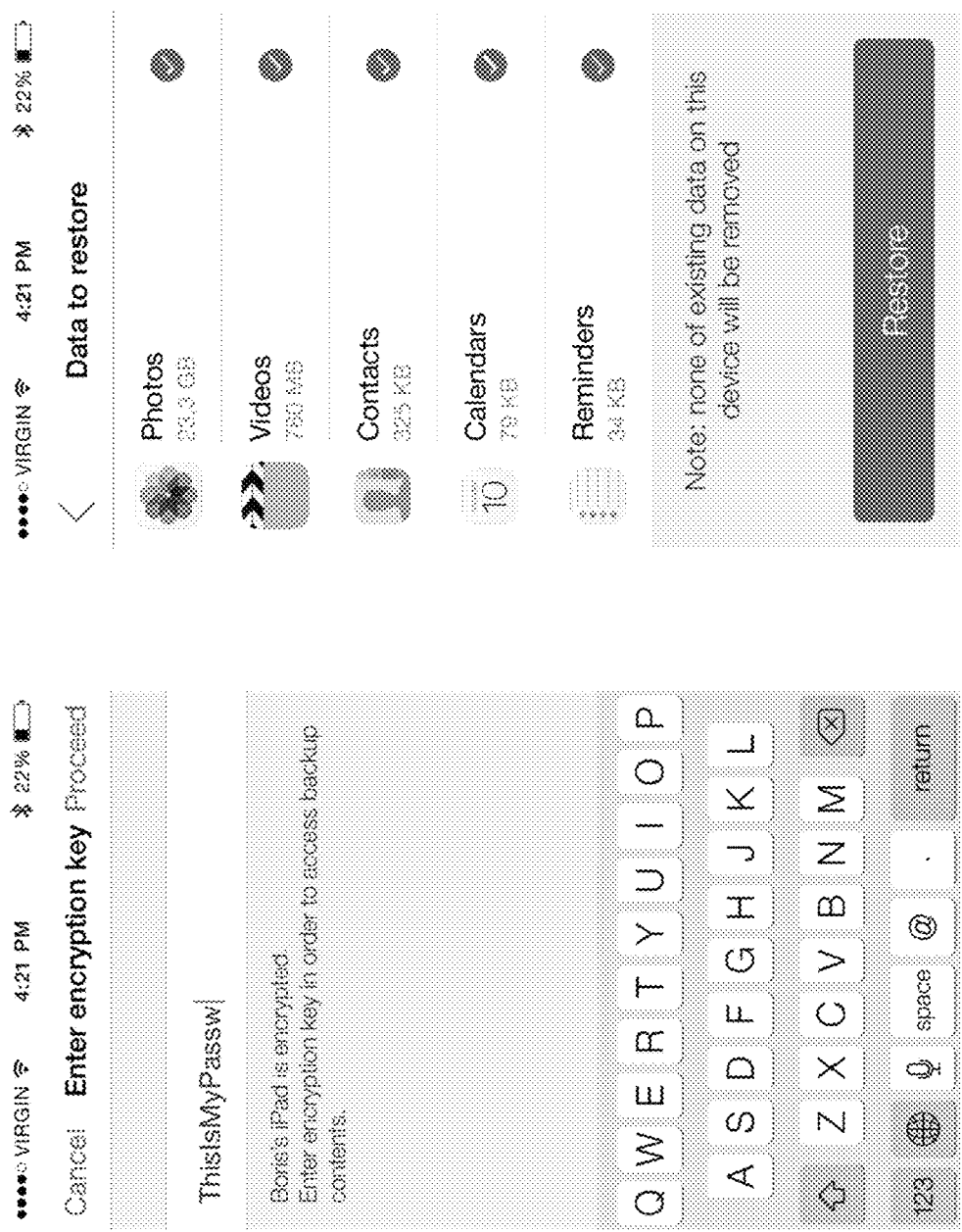
Figure 12:
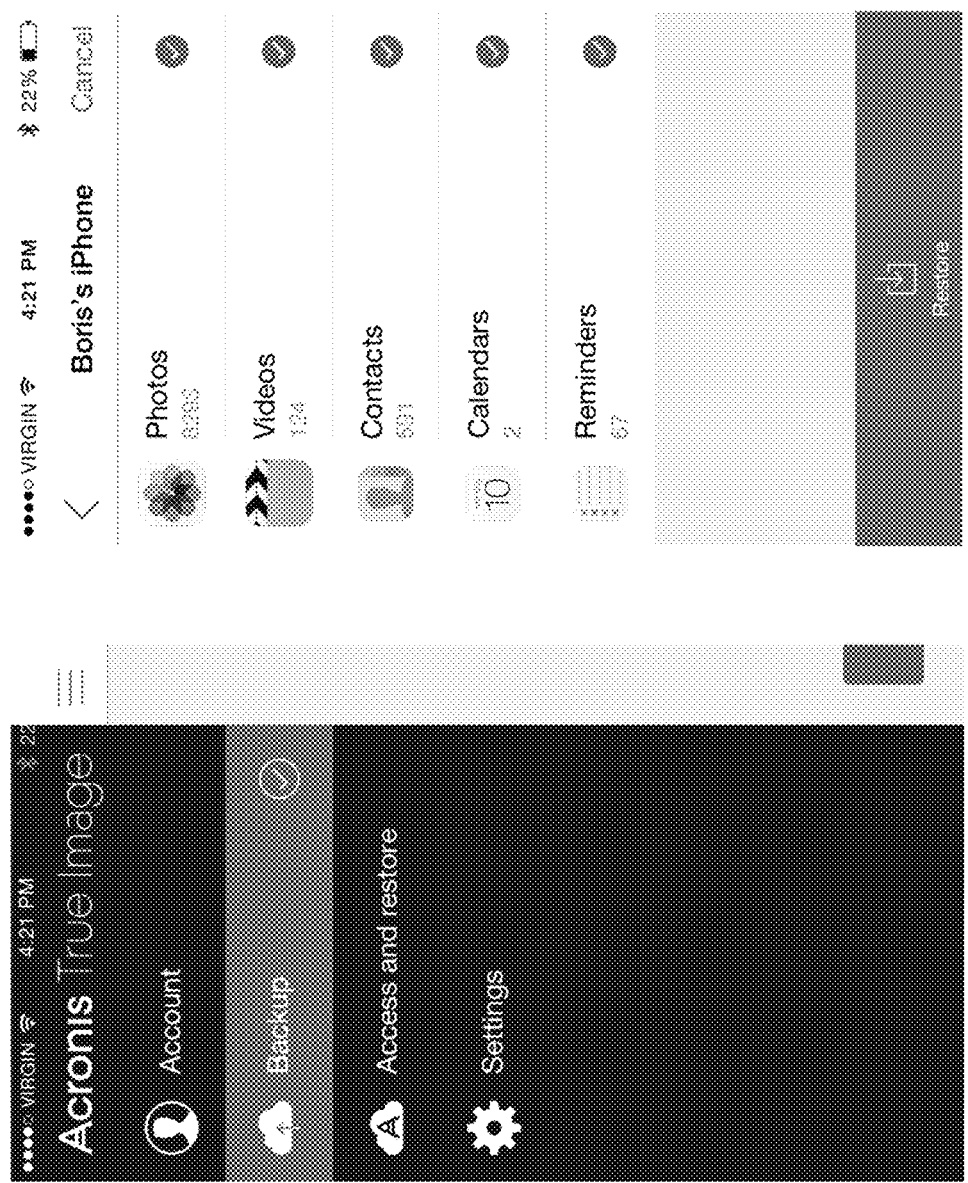
Figure 13:
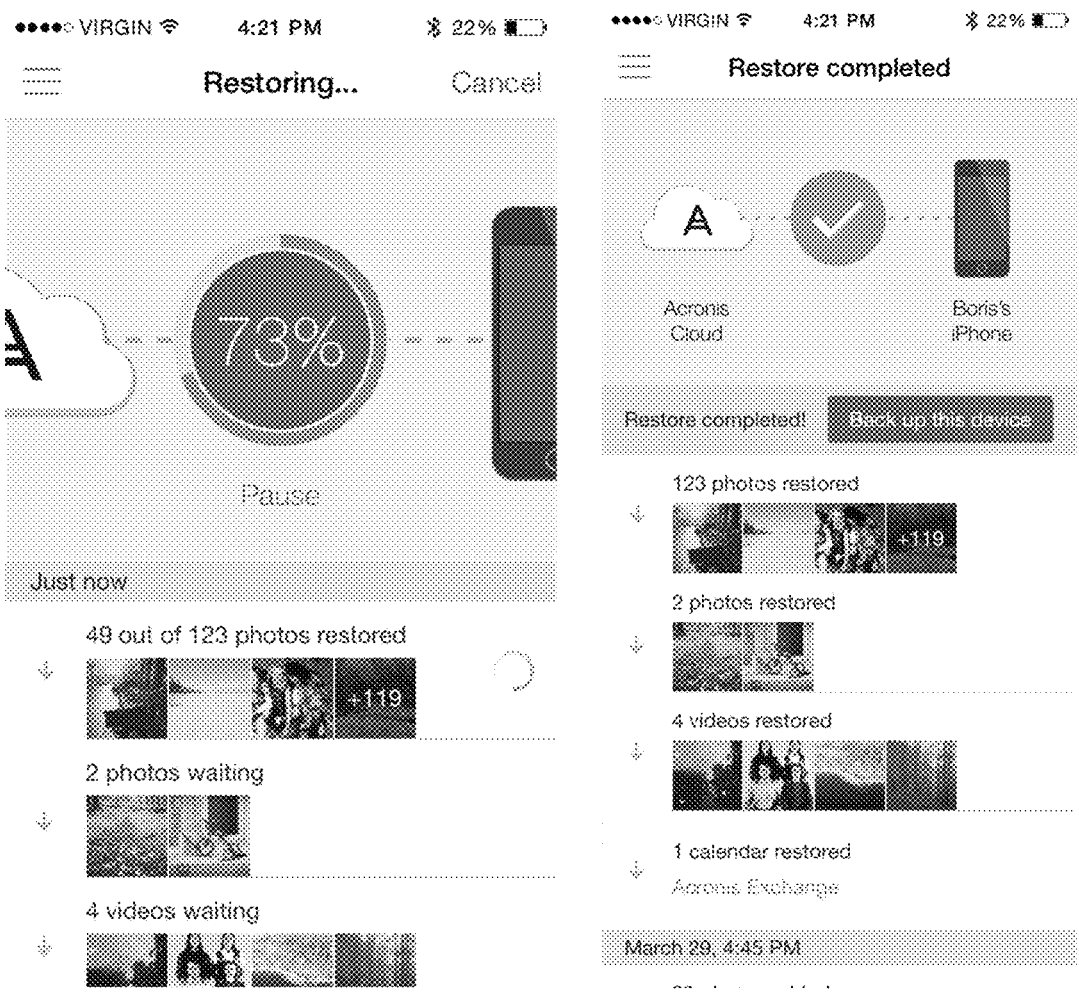

FIG. 8 illustrates a screen with backup button for a user to initiate the backup (on left) and the screen (on the right) illustrating a completed backup. FIG. 9 illustrates how a user can restore pictures from a backup by selecting pictures from a gallery of deleted pictures. FIG. 10 (left screenshot) illustrates a screen, which gives a user an option of creating a new backup or restoring data to a current user device from previous backups. The screen on the right illustrates selection of a user device. FIG. 11 (left screenshot) illustrates a screen for entering user's encryption key in order to access backup content. The right screen illustrates a list of data that can be restored. FIG. 12 illustrates the initial restore screen. FIG. 13 illustrates restore in progress screen (left screenshot) and restore completed screen showing a list of restored items (right screenshot).

Figure 14:
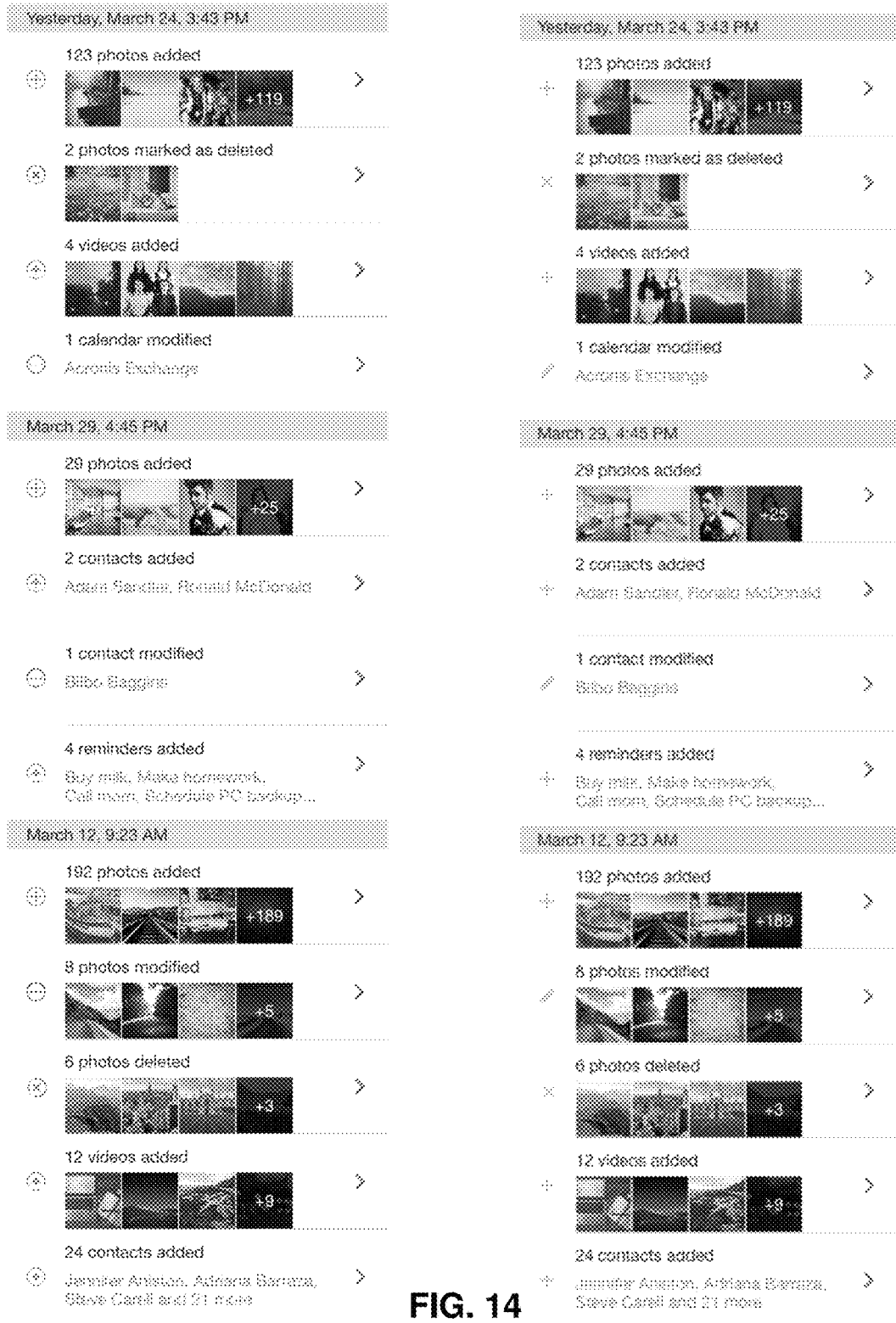
Figure 15:
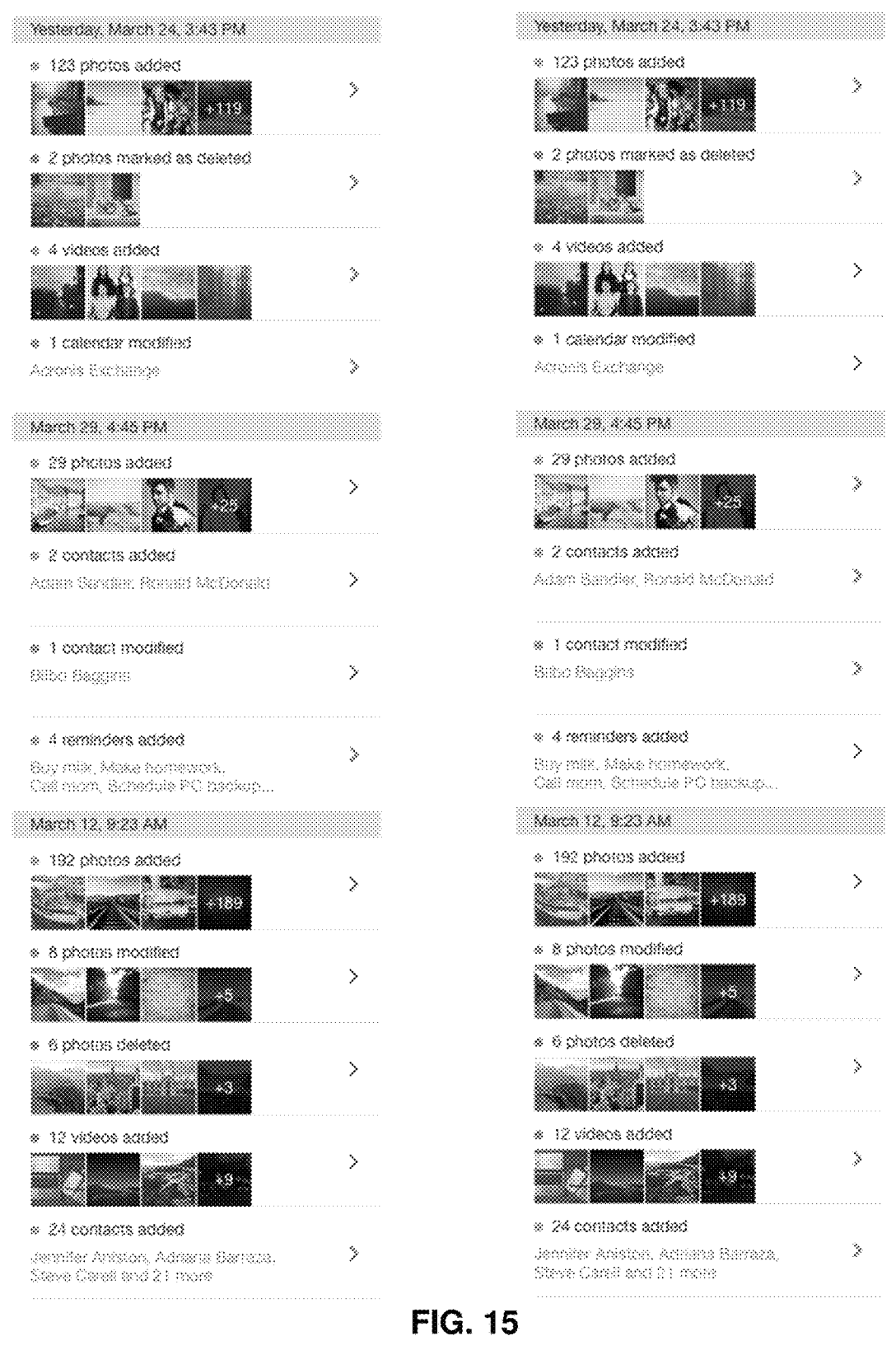
Figure 16:
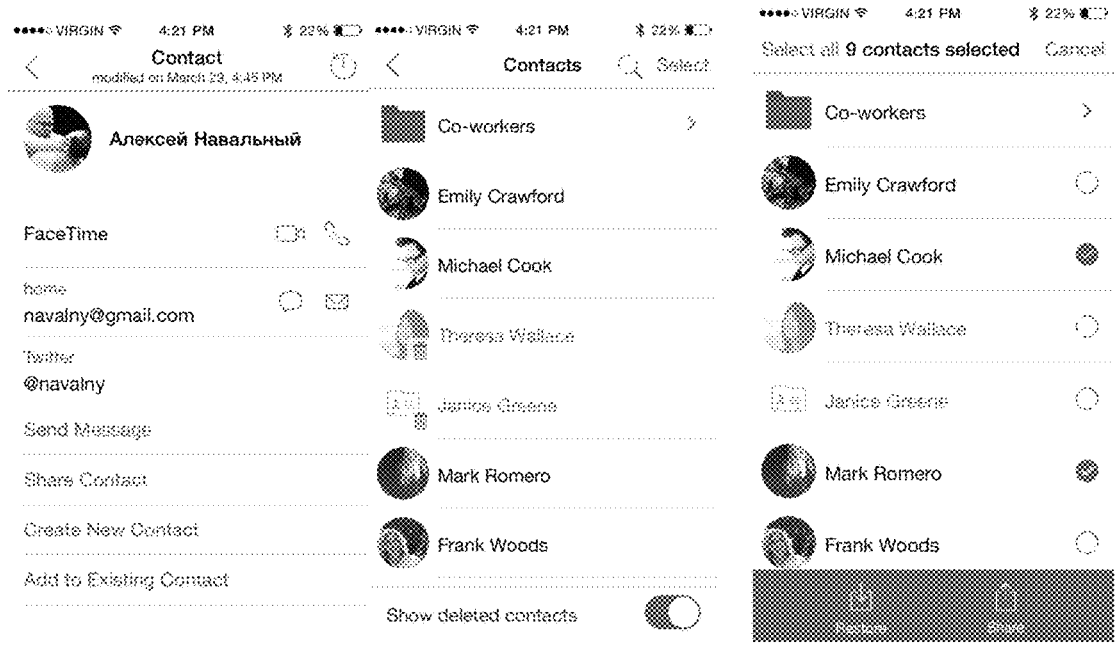
Figure 17:
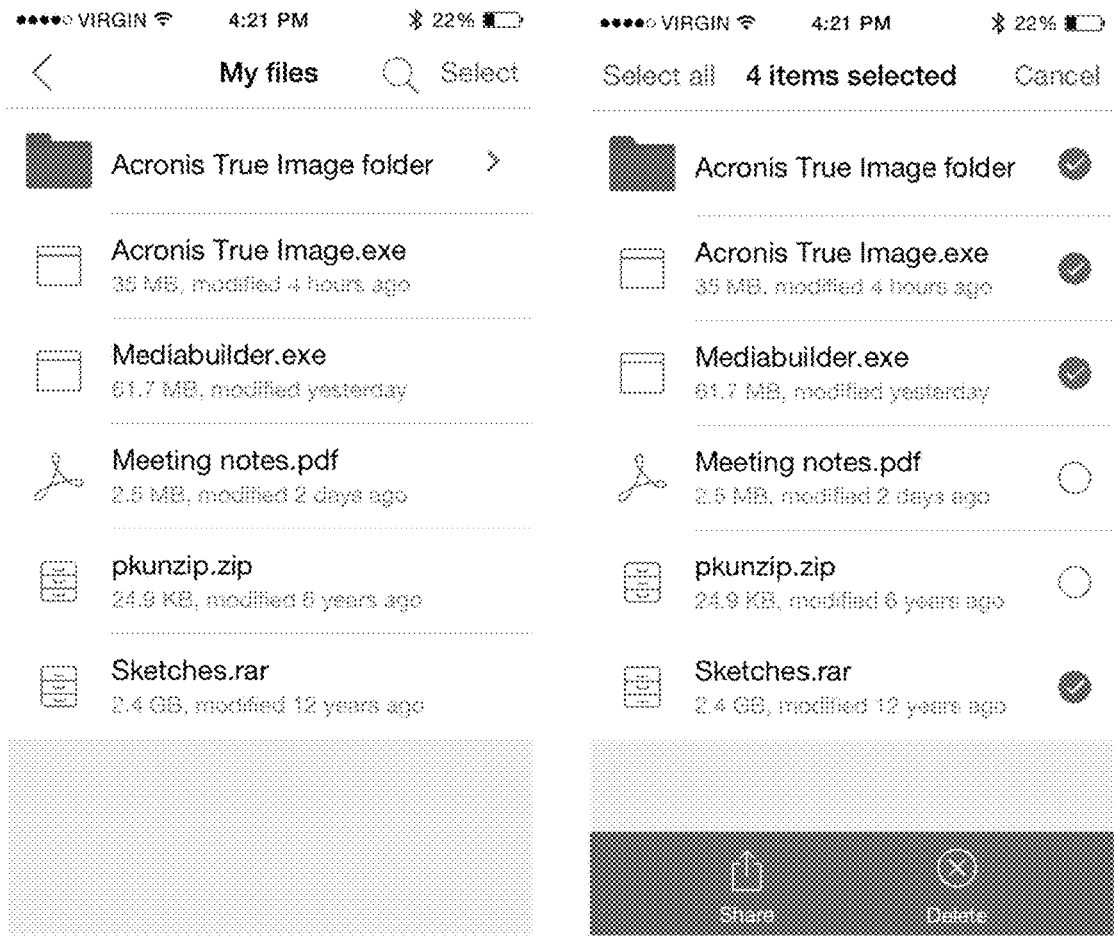
Figure 18:
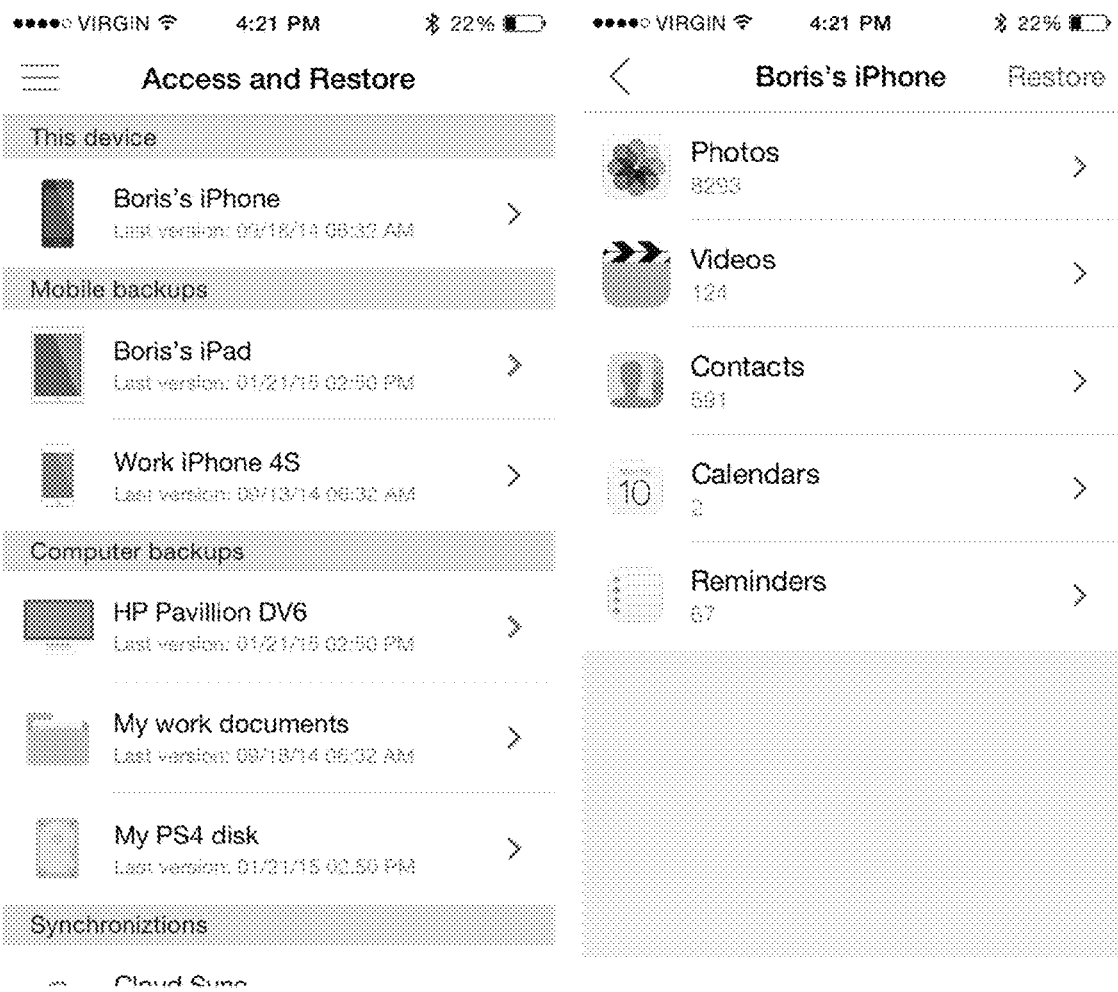
Figure 19:
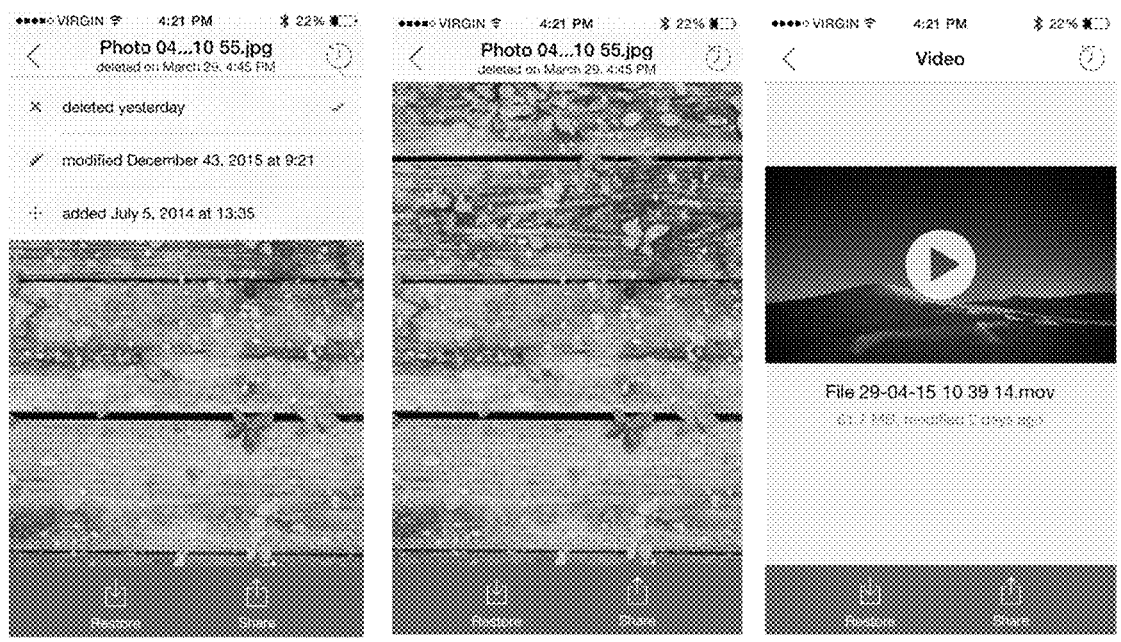
Figure 20:
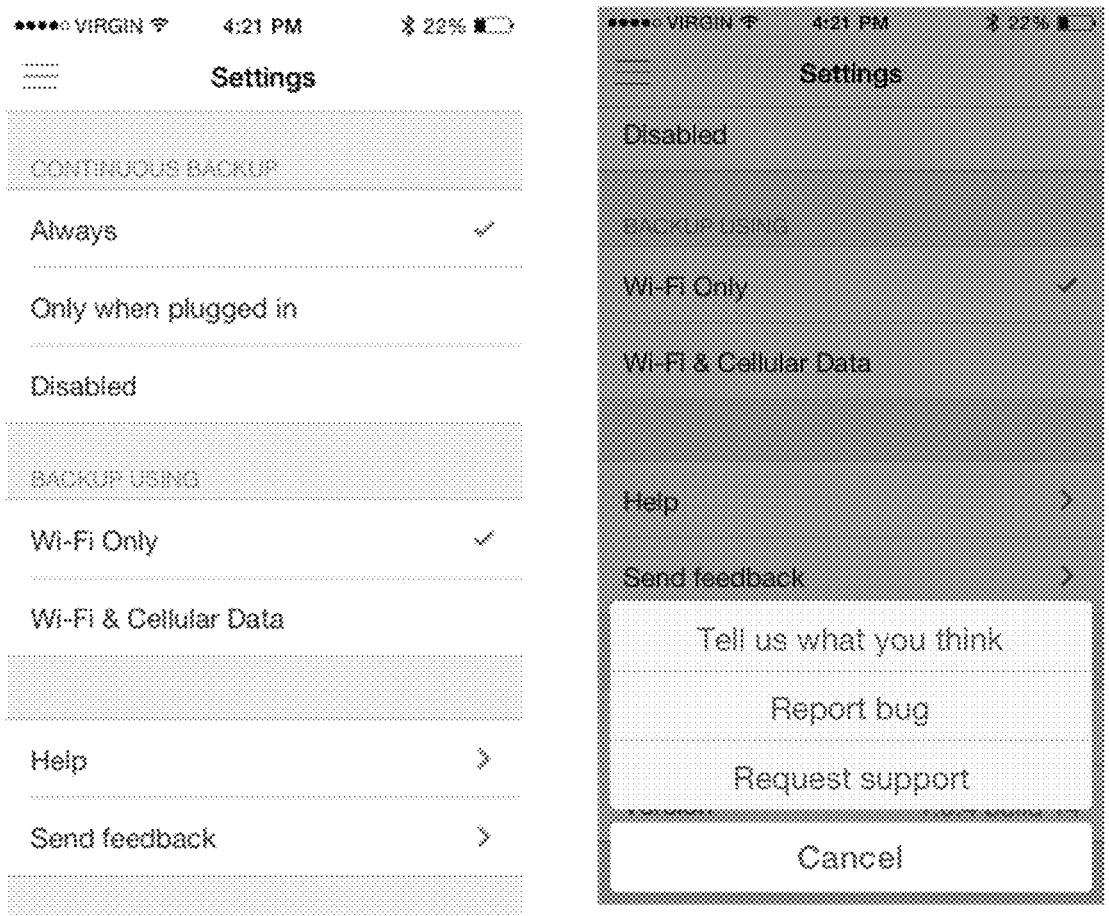
Figure 21:
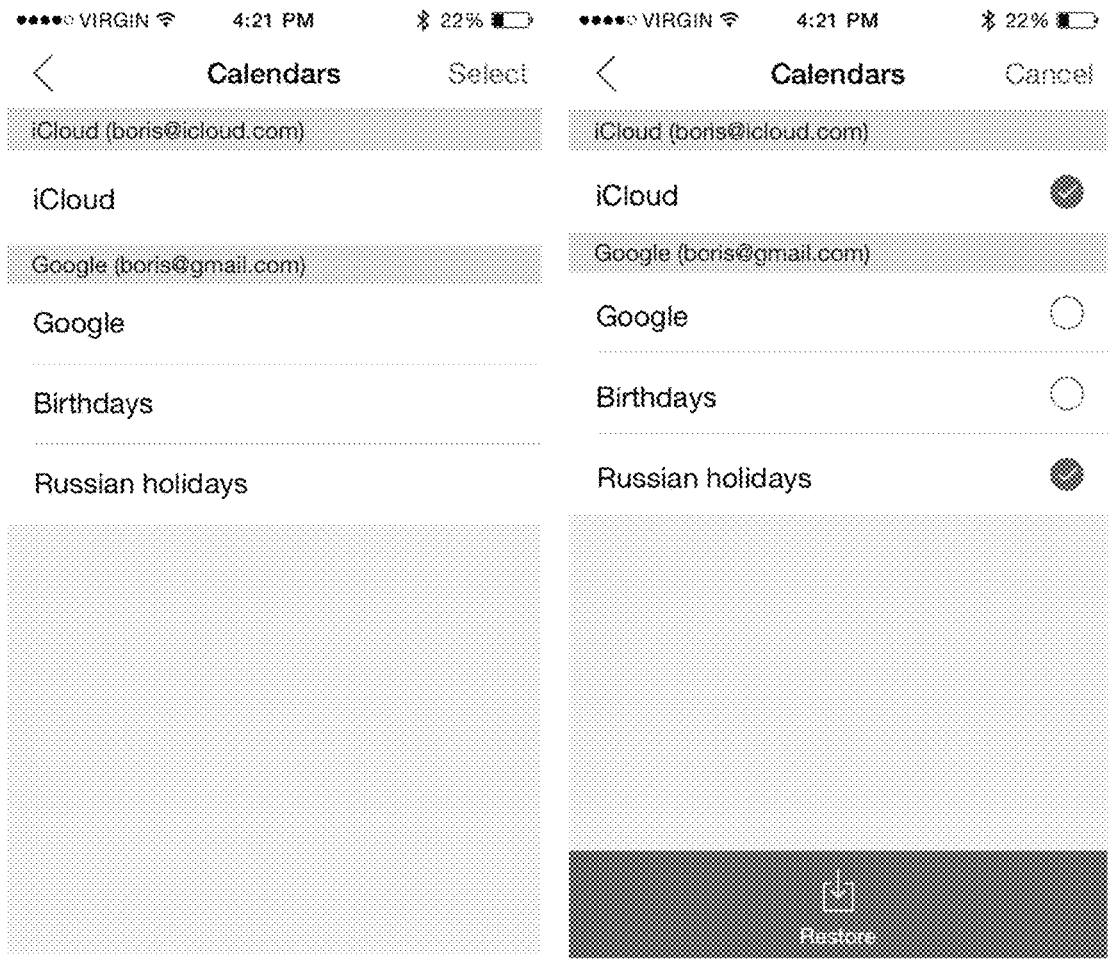
Figure 22:
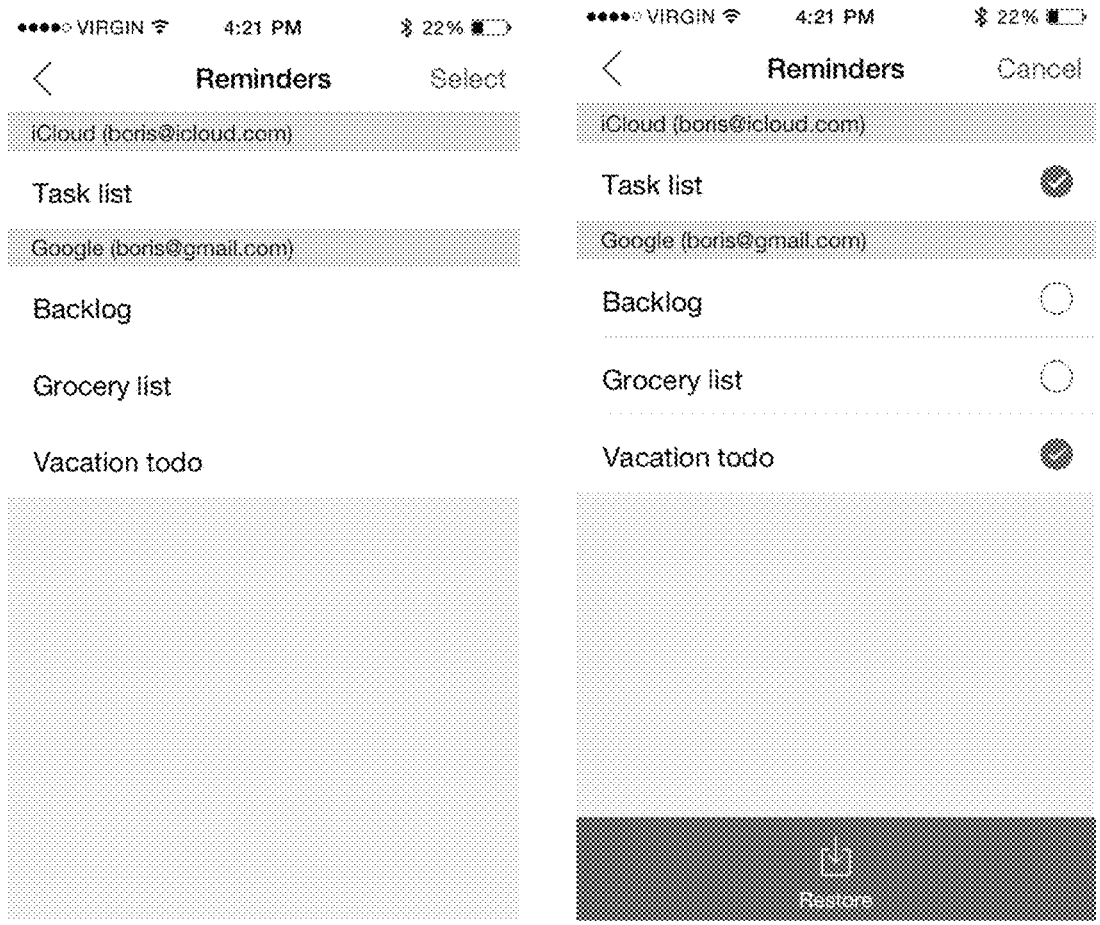

FIGS. 14 and 15 illustrate screenshots depicting backup activities on different days. FIG. 16 illustrates and exemplary contact and selection of deleted contacts for restore. FIG. 17 illustrates handling of the files by the backup/restore application. FIG. 18 illustrates a screen with a list of devices to be restored and a list of items to be restored on the selected device. FIG. 19 illustrates screenshots for restoration of deleted or modified images or videos. FIG. 20 illustrates screenshots for backup settings. FIG. 21 illustrates screenshots for calendar restoration and FIG. 22 illustrates screenshots for reminders restoration. The exemplary embodiment can be applicable to any mobile platforms like iOS, Android, Windows Phone/Tablet, etc.

As another embodiment, a continuous backup can be implemented. The backup of the mobile device data can be performed periodically. One solution is to make a continuous backup if there is a new data on the mobile device. There may be limitations relating to the network/Internet connections (e.g., when using a mobile network), or due to power supply constraints, but, in general, a continuous backup can be implemented applying the same concept as the one employed on desktop devices.

Figure 23:
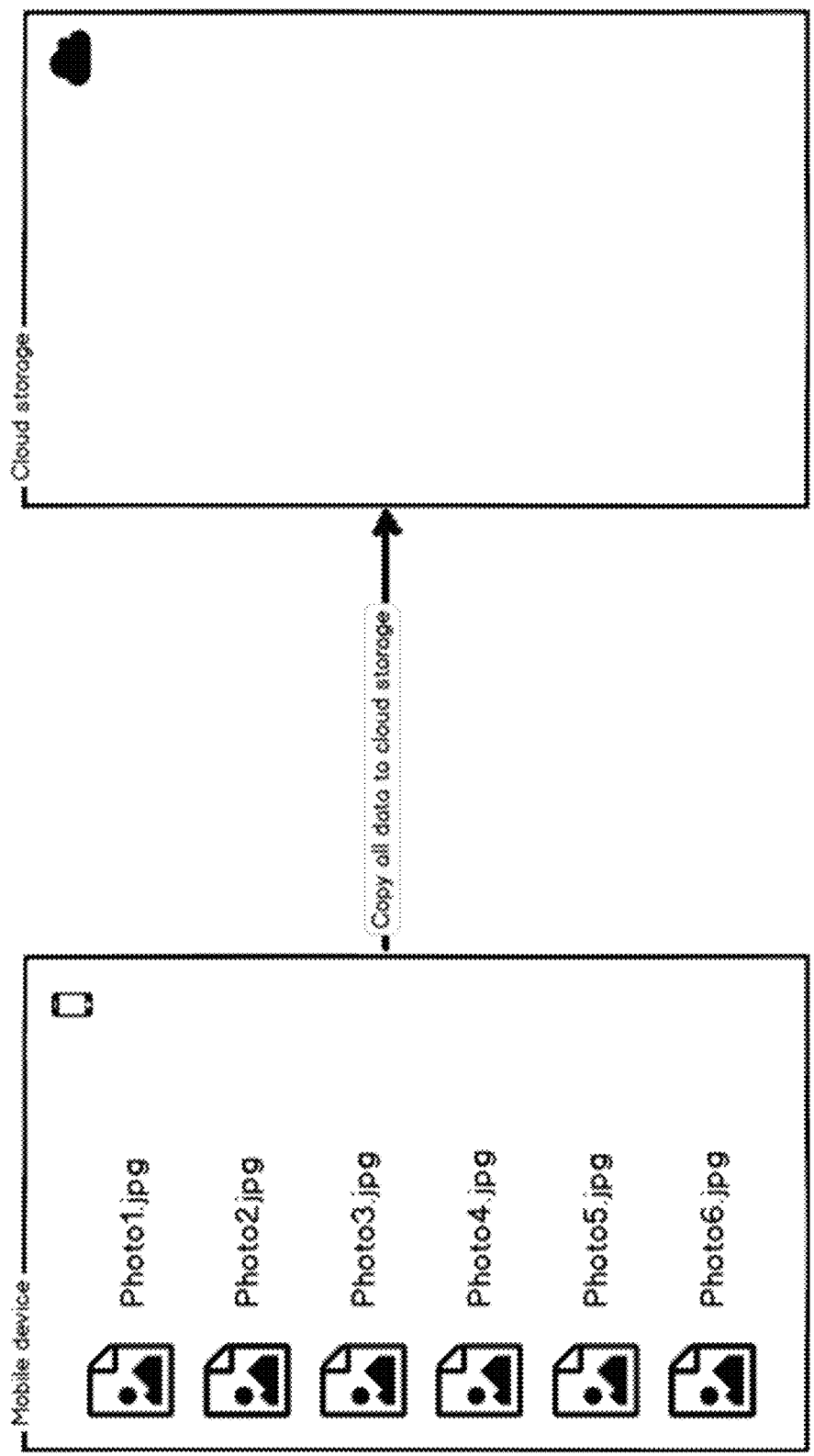
FIGS. 23-26 illustrate additional embodiment relating to continuous backup.
Figure 24:
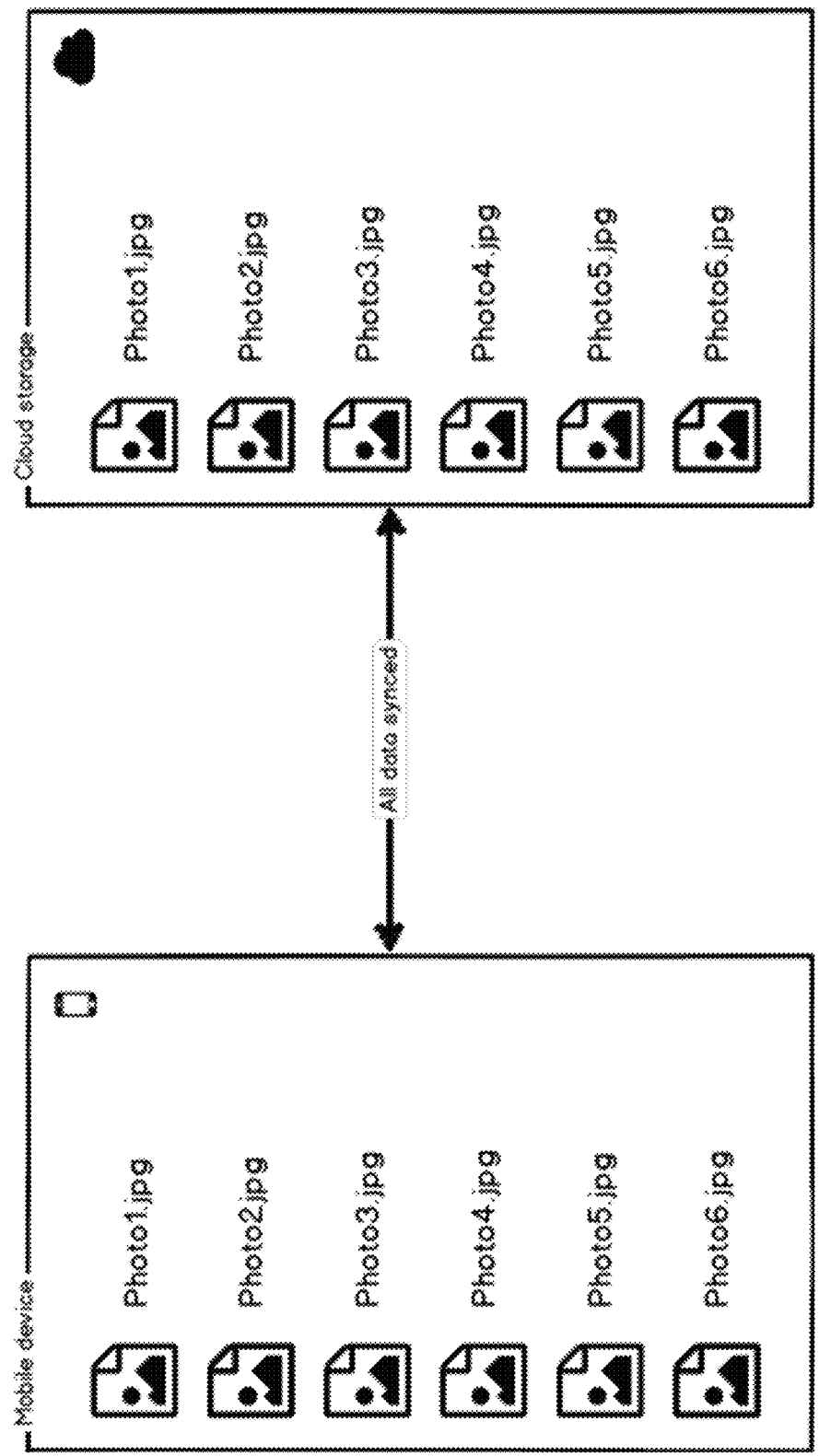

The process works as follows:

When the application is first started, all data from a mobile device is copied to a cloud storage (see FIG. 23). This example reflects a state at the initial point of a mobile backup, where all of the user files residing on the mobile device are backed up to a cloud storage without any analysis of the events. In the background, the backup application compares the data on the cloud and on the device. If they are the same, then nothing happens (see FIG. 24).

Figure 25:
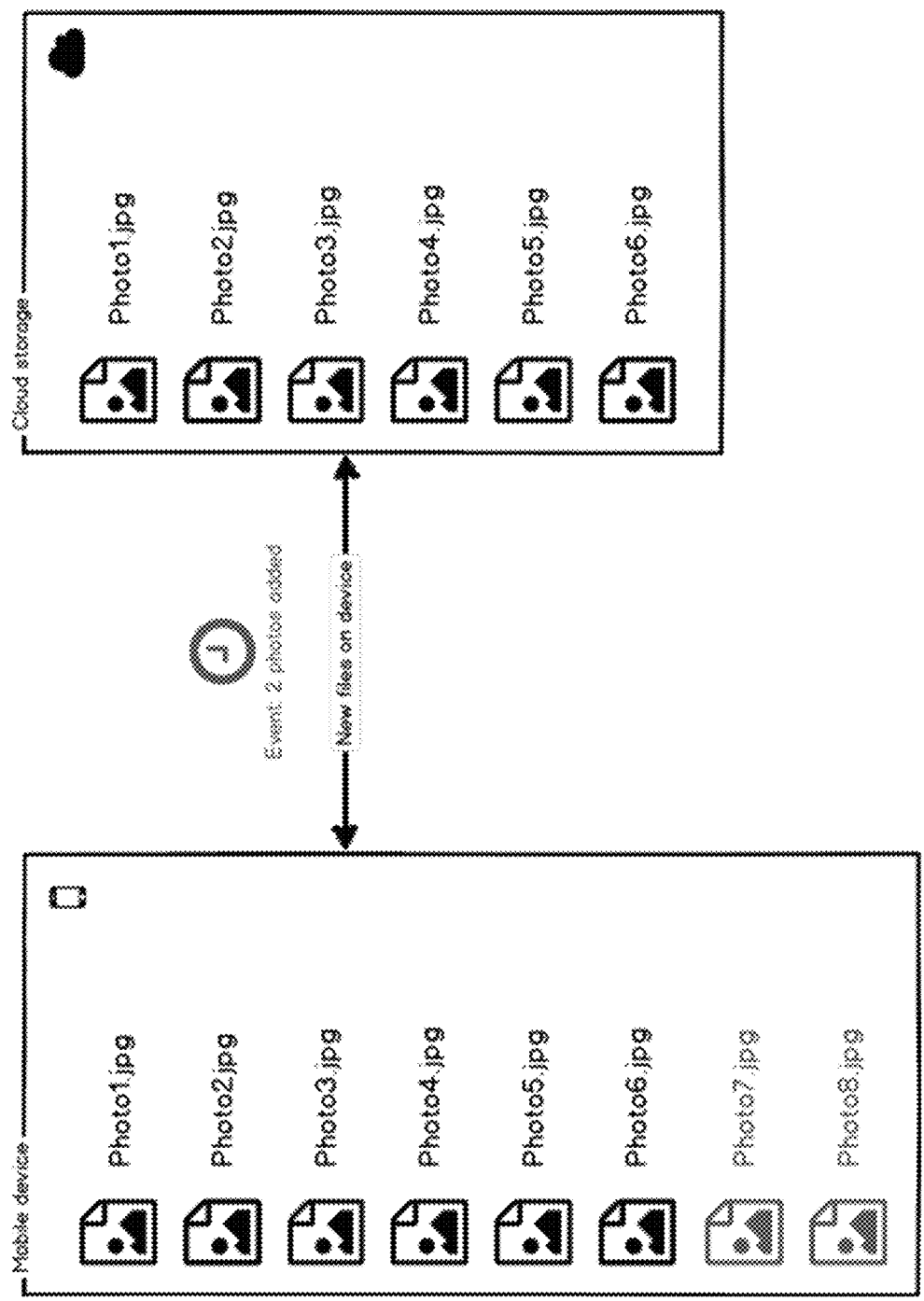
Figure 26:
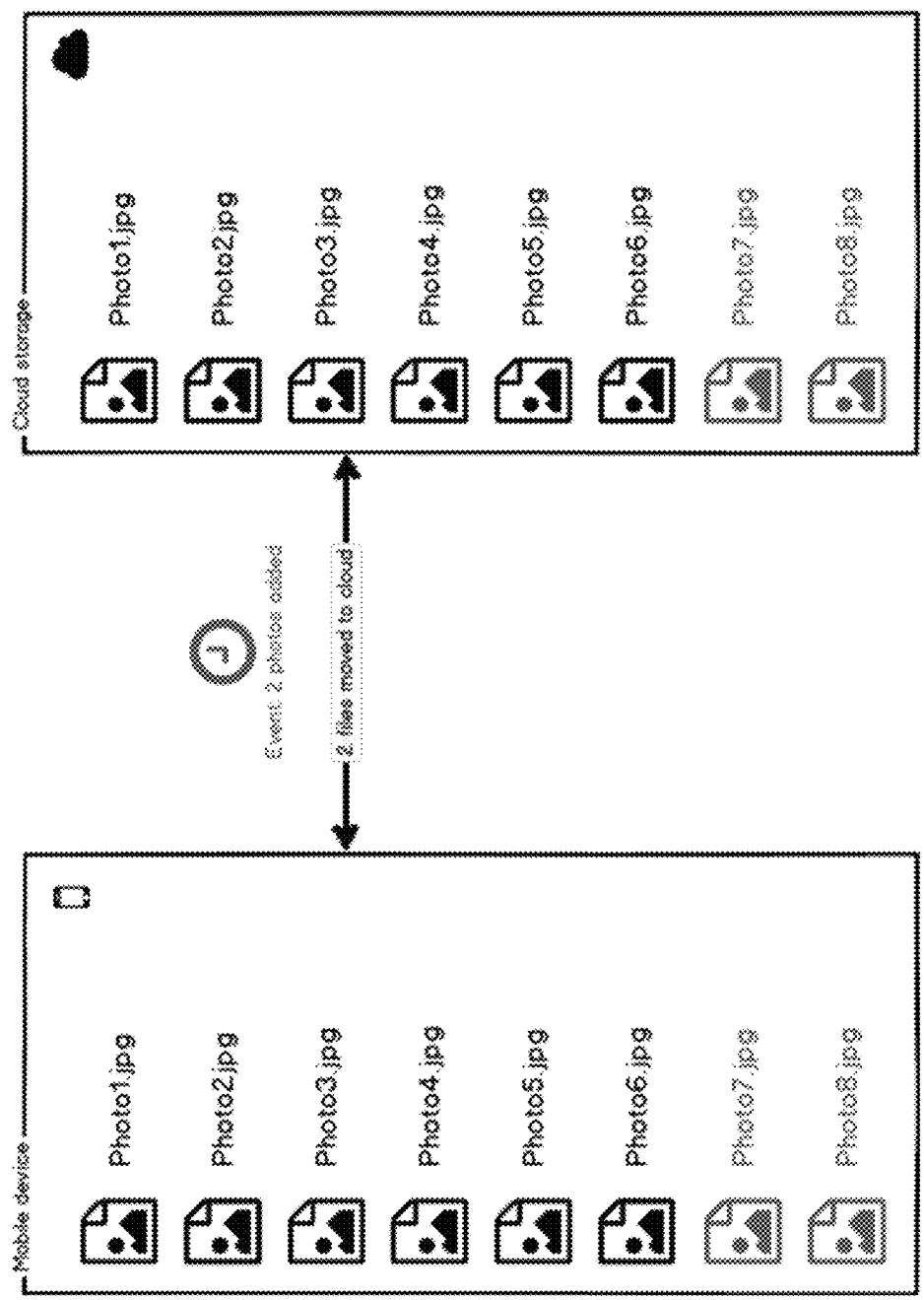

If the new data is detected on the mobile device (in this example, Photo7 and Photo8), the application begins sending the data (i.e., Photo7 and Photo8) to the cloud storage (see FIG. 25) after the expiration of the synchronization timeframe. Then, all data is synced (see FIG. 26) and all the files are identical on the mobile device and on the cloud storage as it was in FIG. 24.

As another embodiment, the data modification event serves as a filter for the cloud storage data. The problem is that the cloud storage can store a lot of data. Some files might have several different versions. They can be edited, modified or overwritten. However, all files in the cloud contain metadata about the events that created or modified these files. Thus, if a user searches for files, he does not need to use concepts such as "version" or "restore point." Instead, he can operate with the events, which is more intuitive for most mobile interfaces and devices. The files residing on the cloud are filtered by the event associated with data modifications (see FIG. 1C). According to the exemplary embodiment, the one-way synchronization (i.e., from the mobile device to the cloud storage) is used. However, data can be synchronized back from the cloud storage to the mobile device upon a user request. In one embodiment, the user data can be synchronized among several mobile devices via the cloud storage provided that each of the devices has access to the same user account.

Figure 27:
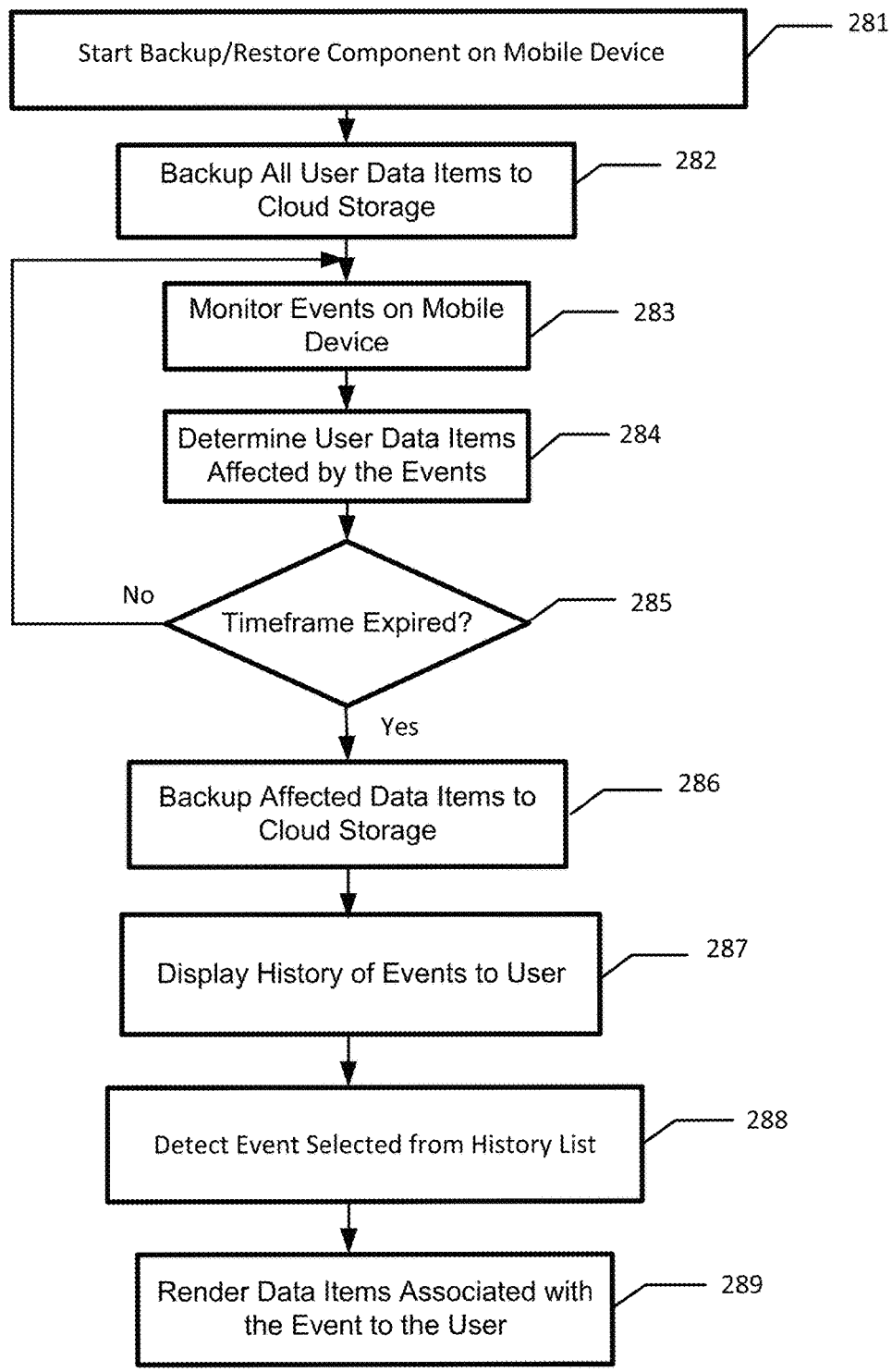
FIG. 27 illustrates a flow chart of a mobile backup method, in accordance with the exemplary embodiment.

FIG. 27 illustrates a flow chart of a mobile backup method, in accordance with the exemplary embodiment. In step 271, a backup/restore component is started on a user mobile device. The backup/restore component backs up all user data items to cloud storage in step 272. In step 273, the backup/restore component monitors events that occur on the mobile device and determines the user data items affected by the events in step 274. If a pre-set timeframe expires in step 275, the backup/restore component backs up the affected data items to the cloud storage in step 276. Otherwise, the backup/restore component monitors events that occur on the mobile device in step 273. The backup/restore component displays a history of the events to the user in step 277. In step 278, the backup/restore component detects an event selected by the user from the events history list and renders the user data items associated with the event to the user in step 279.

Figure 28:
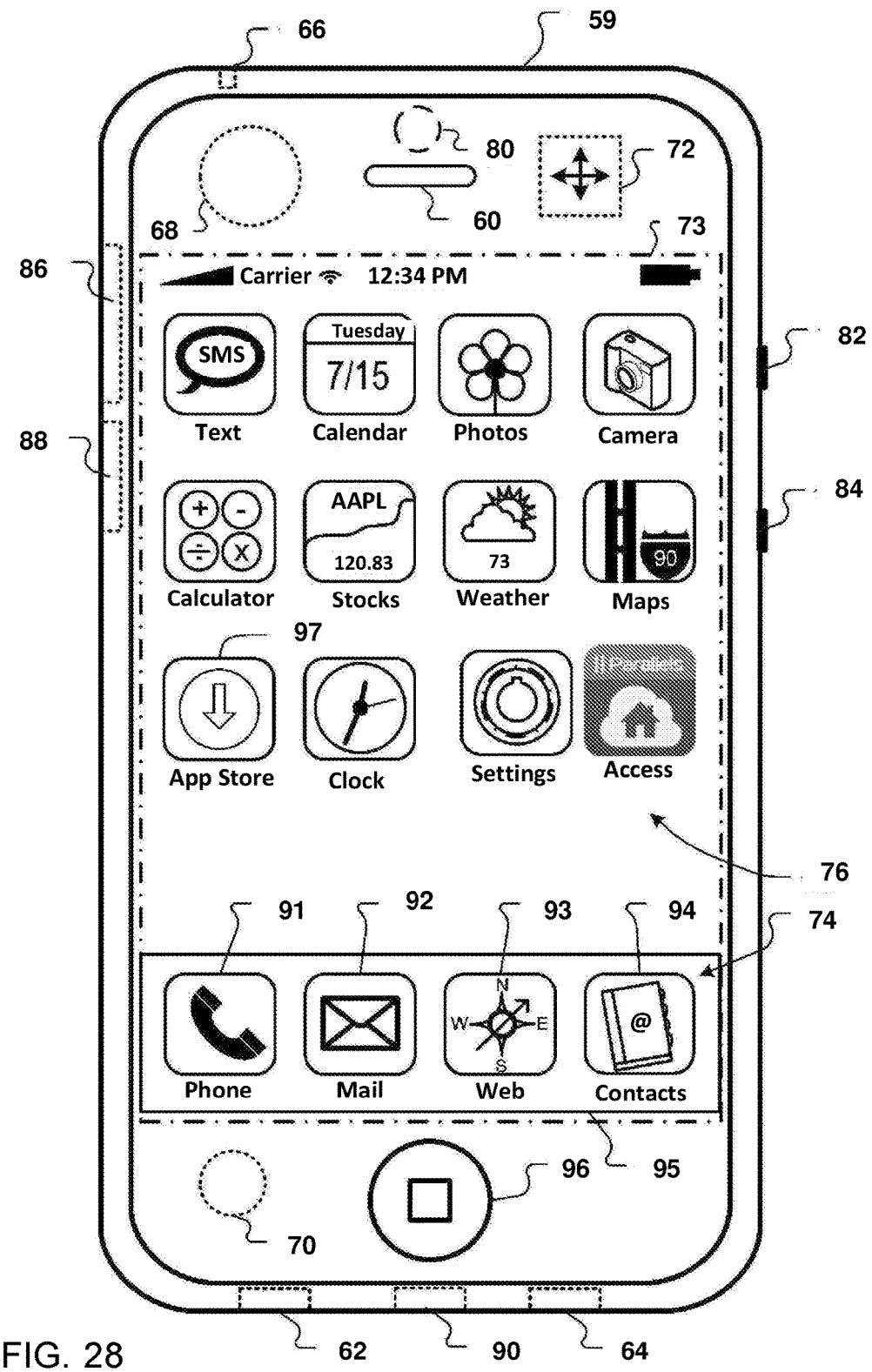
FIG. 28 is a block diagram of an exemplary mobile device that can be used in the invention.

FIG. 28 is a block diagram of an exemplary mobile device 59 on which the invention can be implemented. The mobile device 59 can be, for example, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to haptic and/or tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94. In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality. For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, each corresponding device functionality may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape. In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video. The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

Figure 29:
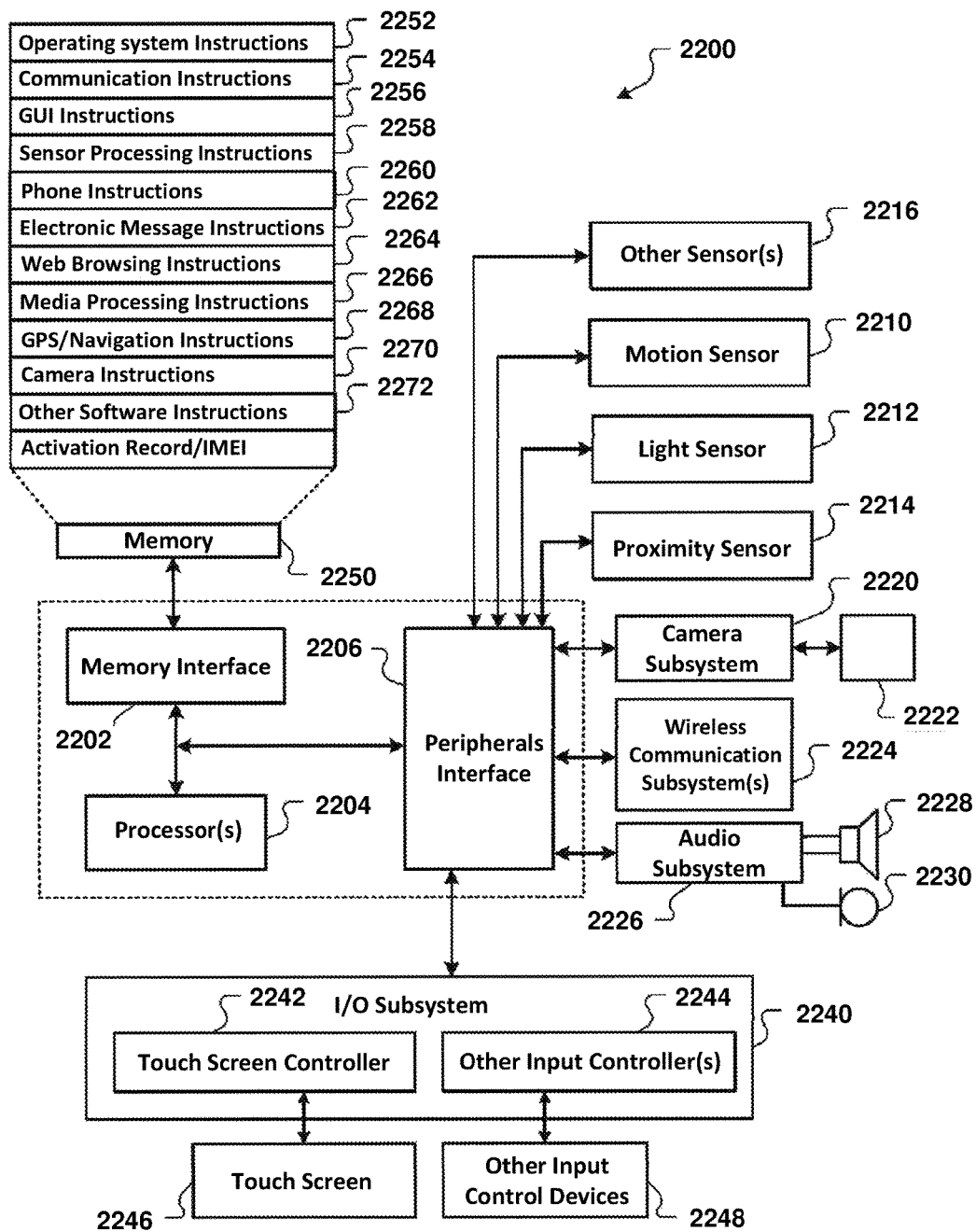
FIG. 29 is a block diagram of an exemplary implementation of the mobile device.

FIG. 29 is a block diagram 2200 of an example implementation of the mobile device 59. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network(s) over which the mobile device 59 is intended to operate.

For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices.

An audio subsystem 2226 can be coupled to a speaker 2228 and a microphone 2230 to facilitate voice-enabled functions, such as voice recognition, voice replication, digital recording, and telephony functions. The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, AAC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, IOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application specific integrated circuits.

Having thus described a preferred embodiment, it should be apparent to those skilled in the art that certain advantages of the described method and system have been achieved. It should also be appreciated that various modifications, adaptations, and alternative embodiments thereof may be made within the scope and spirit of the present invention. The invention is further defined by the following claims.

What is claimed is:

1. A system for event-based backup and restore of user data, the system comprising:
   a mobile device having an internal memory for storing user data items; and
   a backup/restore component running on the mobile devices configured to continuously monitor and log events affecting a state of the user data items,
   wherein:
      the backup/restore component continuously backs up a portion of the user data items affected by the logged events from the mobile device to a cloud storage configured to store backed up user data items,
      the backup/restore component is configured to determine the portion of the user items affected by the logged events by comparing the user data items on the internal memory with the stored backed up user data items on the cloud storage,
      the backup/restore component provides a graphical user interface configured to display a history of the logged events that affected the portion of user data items, including a display of respective user actions associated with each of the logged events, with at least one user action comprising a deletion of the user data item stored on the internal memory, and
      allow a user to select the deleted user data items to be restored from the cloud storage to the internal memory.

2. The system of claim 1, wherein the at least one user action further comprises at least one of:
   adding a data item; and
   modifying a data item.

3. The system of claim 1, wherein at least one of the logged events is generated based on user location, which is different from regularly visited locations identified for the user.

4. The system of claim 1, wherein the data items are any of:
   images;
   video clips;
   calendar items;
   reminders; and
   contacts.

5. The system of claim 1, wherein the backup/restore component runs as a background process.

6. The system of claim 1, wherein if a file residing on the mobile device is found during the comparing and does not have a matching copy on the cloud storage, the file is copied to the cloud storage upon expiration of a pre-set timeframe.

7. The system of claim 1, wherein if a file copy residing on the cloud storage is found during the comparing and does not have a matching source file on the mobile device, an image corresponding to the file is rendered, without restoring the file, via the graphical user interface of the backup/restore component as a deleted file available for restoration upon a user request.

8. The system of claim 1 wherein the backup/restore component compares the user data items on the internal memory with the stored backed up user data items on the cloud storage using at least one of:
   a file name;
   a checksum; and
   a file size.

9. A method for event-based backup and restore of user data located on a mobile device, the method comprising:
   starting a backup/restore component on the mobile device;
   backing up user data items stored in internal memory of the mobile device to a cloud storage;
   monitoring events occurring on the mobile device;
   determining a portion of the user data items affected by the events by comparing the user data items on the internal memory with the backed up user data items on the cloud storage;
   backing up the portion of the affected user data items to the cloud storage upon expiration of a pre-set timeframe;
   displaying, on a graphical user interface, a history list of the logged events; that affected the portion of user data items, including a display of respective user actions associated with each of the logged events, with at least one user action comprising a deletion of the user data item stored on the internal memory, and
   receiving a selection of a deleted user data item from the history list by the user; and
   restoring, in the internal memory of the mobile device, the selected deleted user data items associated with the selection from the user.

10. The method of claim 9, further comprising copying a file to the cloud storage upon expiration of a pre-set timeframe, if a matching copy of the file is not found on the cloud storage during the comparing of the user data items on the internal memory with the backed up user data items on the cloud storage.

11. The method of claim 9, further comprising rendering an image of a file residing on the cloud storage, without restoring the file, to the user via the graphical user interface of the backup/restore component as a deleted file available for restoration, if a matching source file is not found on the mobile device during the comparing of the user data items on the internal memory with the backed up user data items on the cloud storage.

12. The method of claim 9, further comprising comparing user files residing on the mobile device against corresponding file copies residing on the cloud storage using a combination of a file name and a file size.

13. The method of claim 9, further comprising comparing user files residing on the mobile device against corresponding file copies residing on the cloud storage using files' checksums.

14. The method of claim 9, further comprising backing up the user data items to any of:
   a local server;
   a personal attachable external storage; and
   a network storage.

15. The method of claim 9, further comprising ranking the user data items based on a frequency and a number of accesses.

16. The method of claim 15, further comprising automatically removing the user data items having lowest rank when the user mobile device reaches its disk space limit.

17. The method of claim 9, further comprising prompting the user for removal of the user data items from the mobile device and removing the data items selected by the user.

18. The method of claim 9, further comprising archiving the user data items on the cloud storage based on a location of origin of the data items and rendering the data items to the user by the location of the origin.

19. A non-transitory computer readable medium storing computer executable instructions for event-based backup and restore of user data located on a mobile device, including instructions for:
   starting a backup/restore component on the mobile device;
   backing up user data items stored in internal memory of the mobile device to a cloud storage;
   monitoring events occurring on the mobile device;
   determining a portion of the user data items affected by the events by comparing the user data items on the internal memory with the backed up user data items on the cloud storage;
   backing up the portion of the affected user data items to the cloud storage upon expiration of a pre-set timeframe;
   displaying, on a graphical user interface, a history list of the logged events that affected the portion of user data items, including a display of respective user actions associated with each of the logged events, with at least one user action comprising a deletion of the user data item stored on the internal memory, and
   receiving a selection of a deleted user data item from the history list by the user; and
   restoring, in the internal memory of the mobile device, the selected deleted user data items associated with the selection from the user.

20. The non-transitory computer readable medium of claim 19, further comprising instructions for rendering an image of a file residing on the cloud storage, without restoring the file, to the user via the graphical user interface of the backup/restore component as a deleted file available for restoration, if a matching source file is not found on the mobile device during the comparing of the user data items on the internal memory with the backed up user data items on the cloud storage.

21. The non-transitory computer readable medium of claim 19, further comprising instructions for comparing user files residing on the mobile device against corresponding file copies residing on the cloud storage using files' checksums.

* * * * *